June 23, 1953    L. P. BLACK    2,642,659
AUTOMATIC FACSIMILE WRITING AND DRAWING MACHINE
Filed Aug. 23, 1948    13 Sheets-Sheet 1

Inventor
Leon Paul Black
By Munn, Liddy, Macnum & Rich
ATTORNEYS

June 23, 1953     L. P. BLACK     2,642,659
AUTOMATIC FACSIMILE WRITING AND DRAWING MACHINE
Filed Aug. 23, 1948     13 Sheets-Sheet 2

Inventor
Leon Paul Black
ATTORNEYS

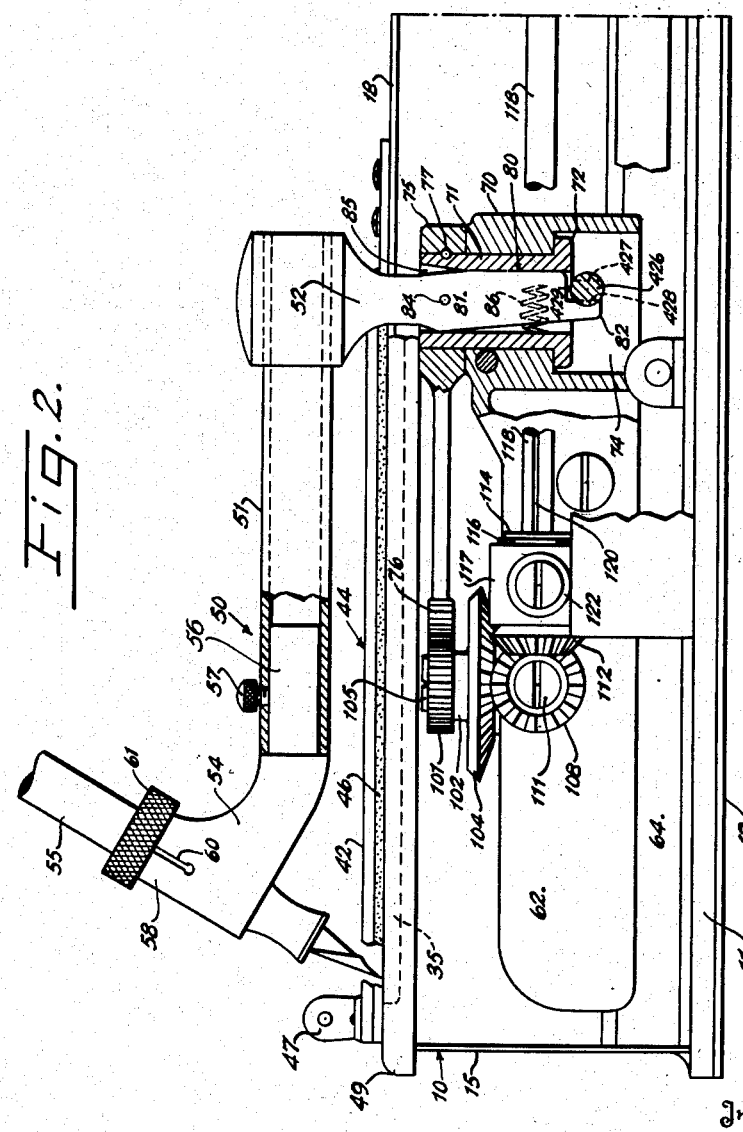

June 23, 1953  L. P. BLACK  2,642,659
AUTOMATIC FACSIMILE WRITING AND DRAWING MACHINE
Filed Aug. 23, 1948  13 Sheets-Sheet 4

INVENTOR.
Leon Paul Black
BY
Munn, Liddy, Maccum & Rich
ATTORNEYS

June 23, 1953 L. P. BLACK 2,642,659
AUTOMATIC FACSIMILE WRITING AND DRAWING MACHINE
Filed Aug. 23, 1948 13 Sheets-Sheet 5
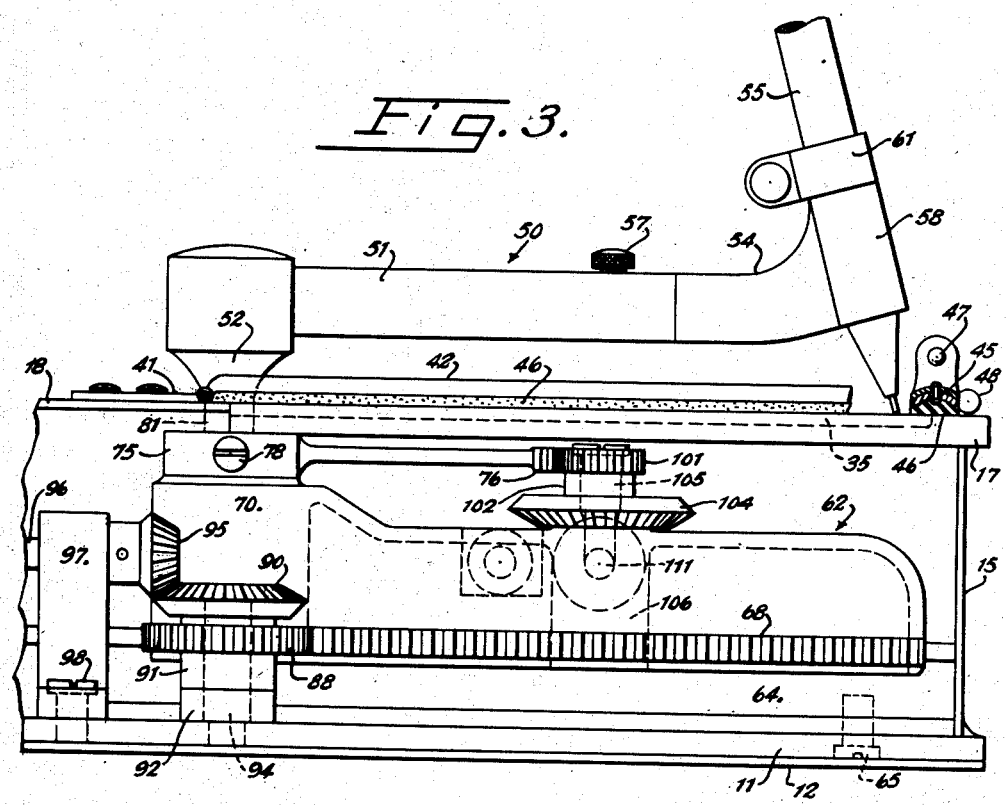
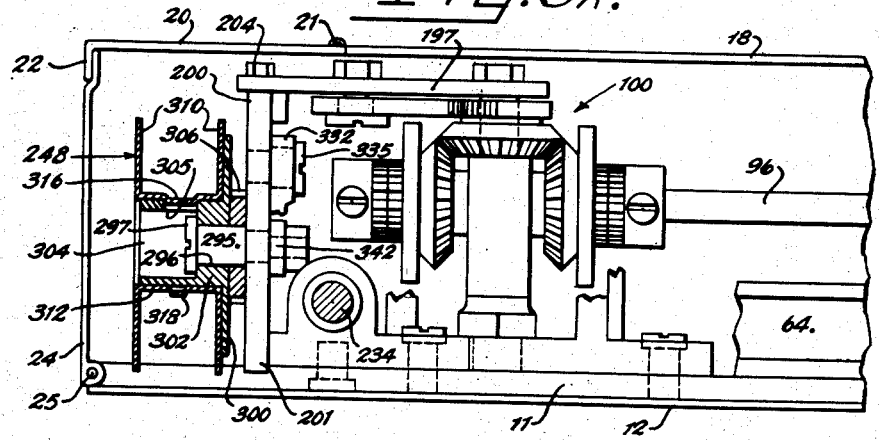
INVENTOR.
Leon Paul Black
BY
Munn, Liddy, Glascum & Rich
ATTORNEYS June 23, 1953
L. P. BLACK
2,642,659
AUTOMATIC FACSIMILE WRITING AND DRAWING MACHINE
Filed Aug. 23, 1948
13 Sheets-Sheet 6
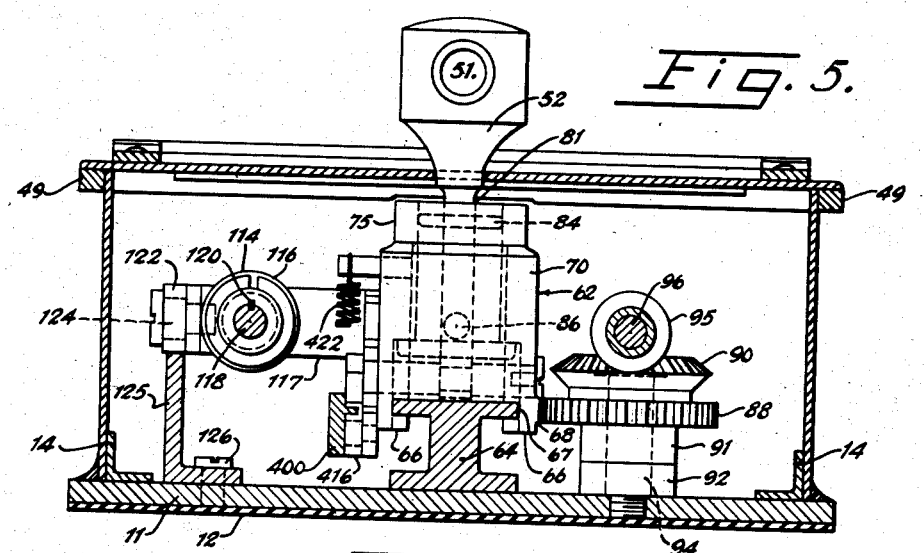
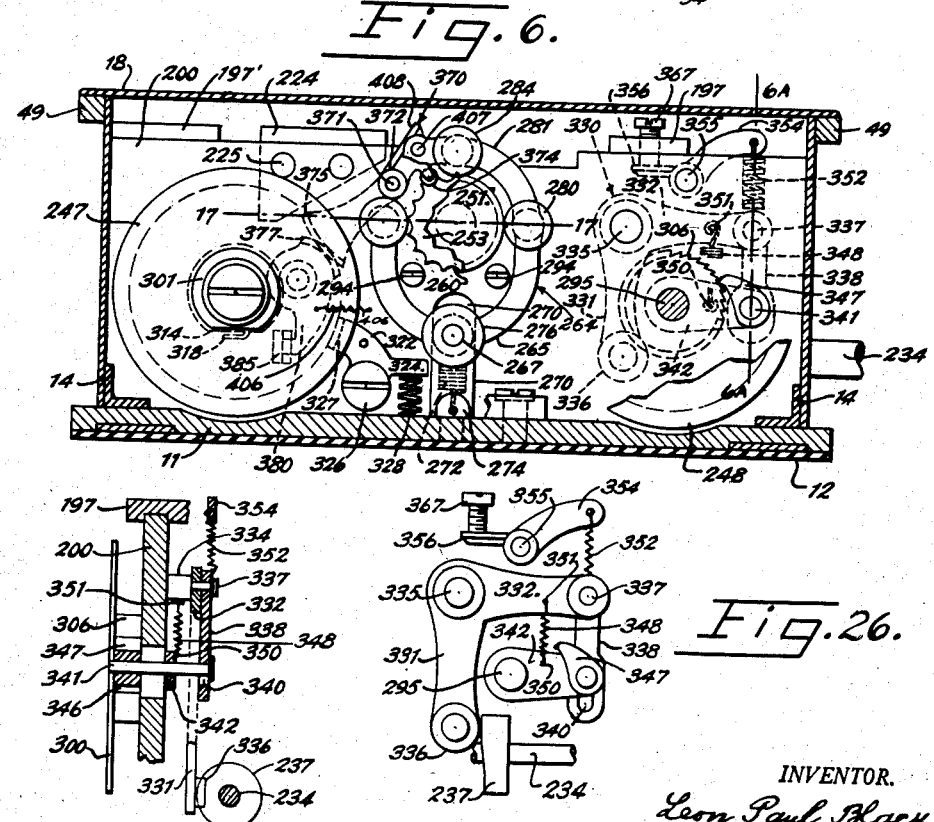
INVENTOR.
Leon Paul Black
BY
Mann, Liddy, Maccum & Rich
ATTORNEYS June 23, 1953 L. P. BLACK 2,642,659
AUTOMATIC FACSIMILE WRITING AND DRAWING MACHINE
Filed Aug. 23, 1948 13 Sheets-Sheet 7
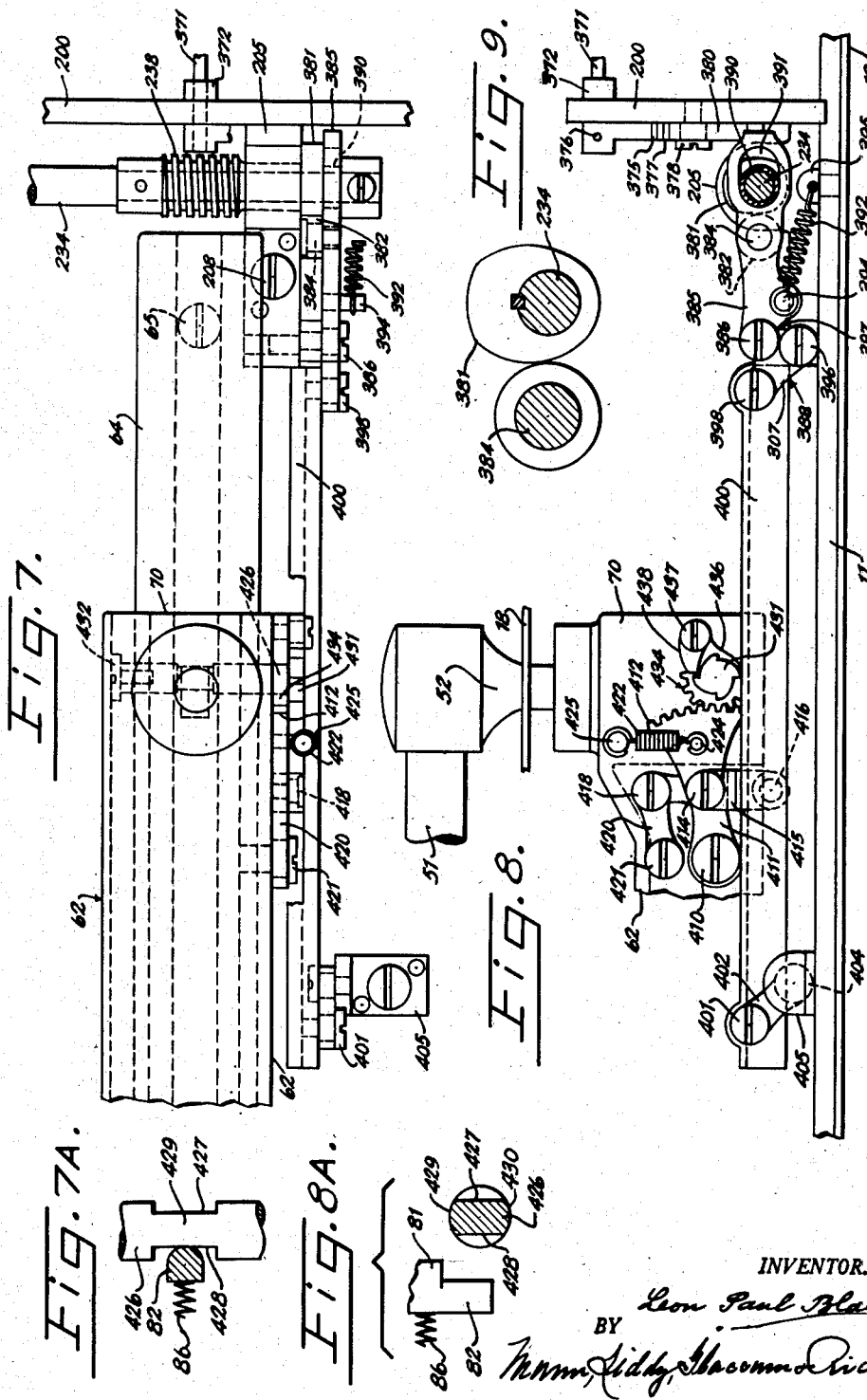

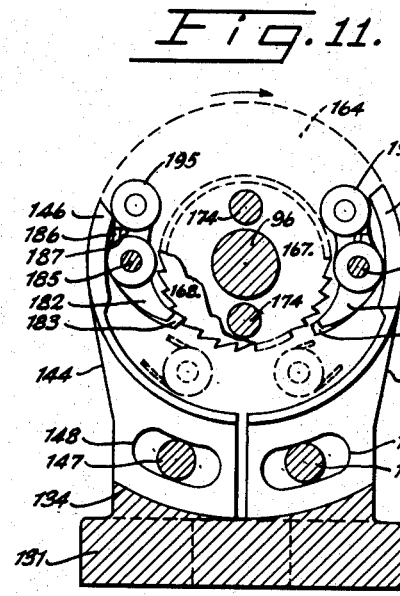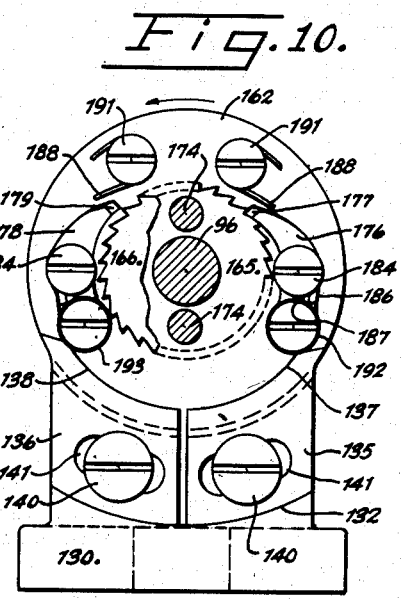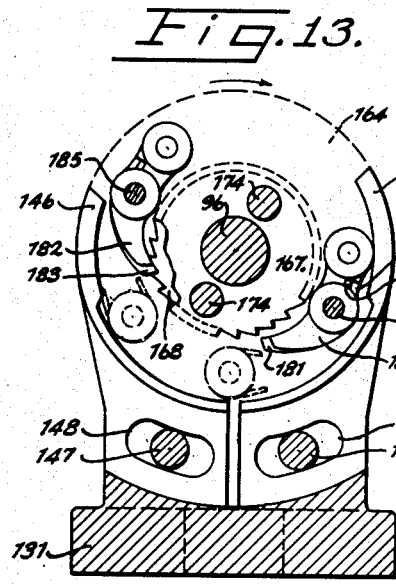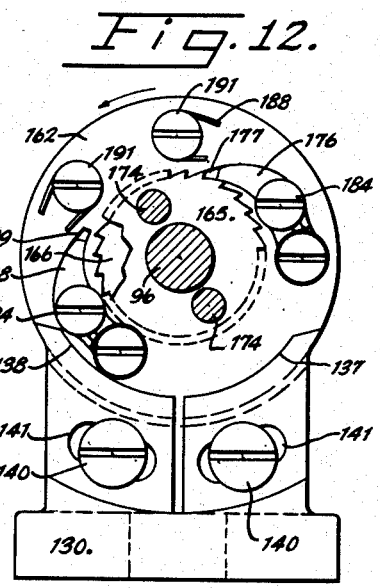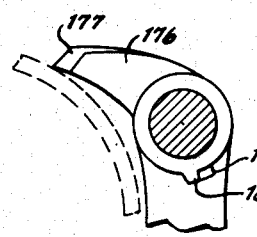

INVENTOR.
Leon Paul Black
BY
ATTORNEYS

June 23, 1953          L. P. BLACK          2,642,659
AUTOMATIC FACSIMILE WRITING AND DRAWING MACHINE
Filed Aug. 23, 1948          13 Sheets-Sheet 10
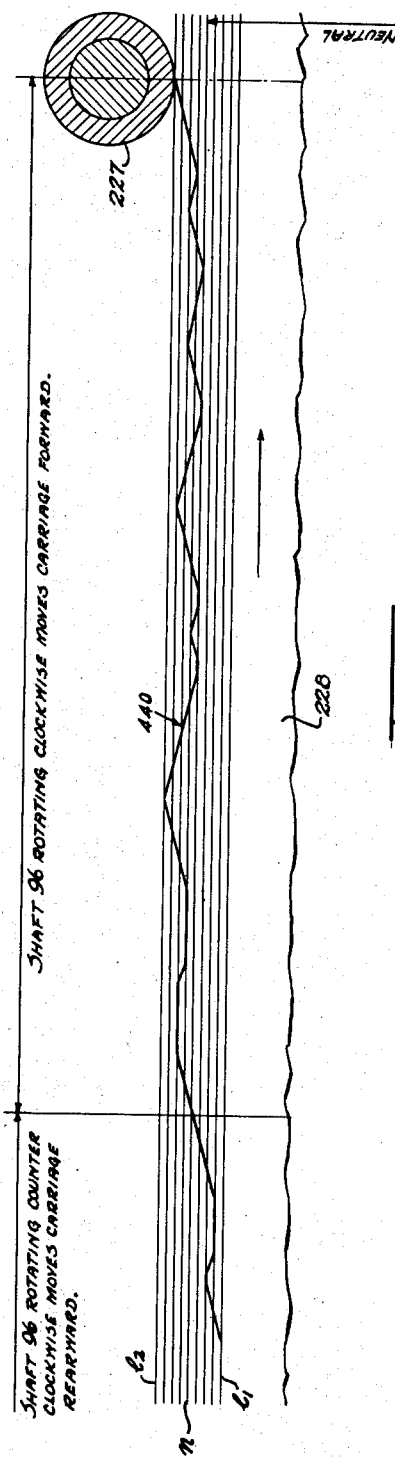
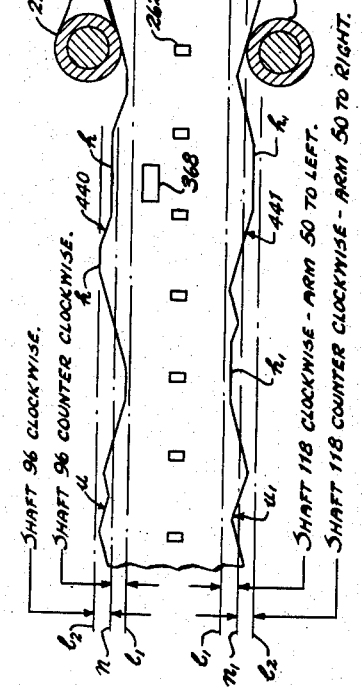
Inventor
Leon Paul Black
ATTORNEYS June 23, 1953 L. P. BLACK 2,642,659
AUTOMATIC FACSIMILE WRITING AND DRAWING MACHINE
Filed Aug. 23, 1948 13 Sheets-Sheet 11
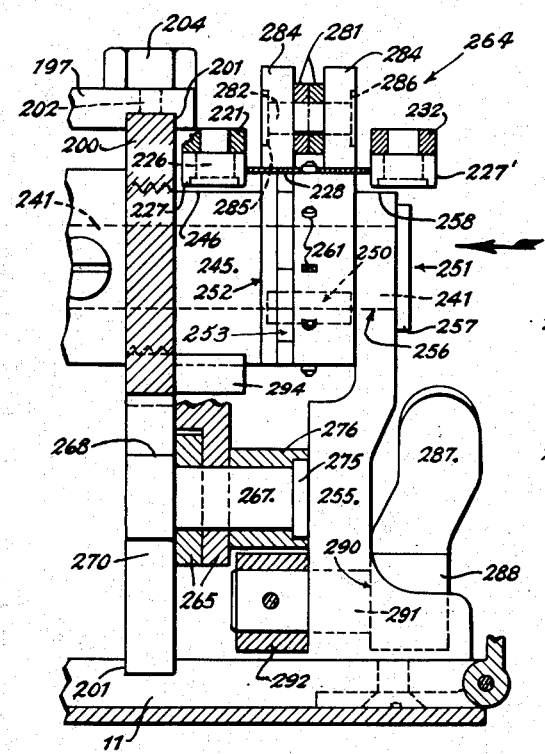
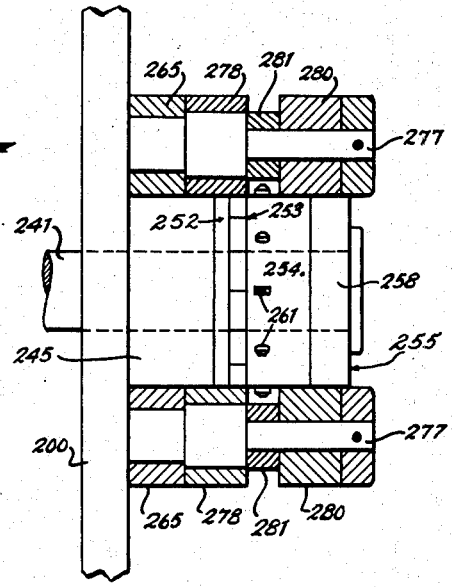
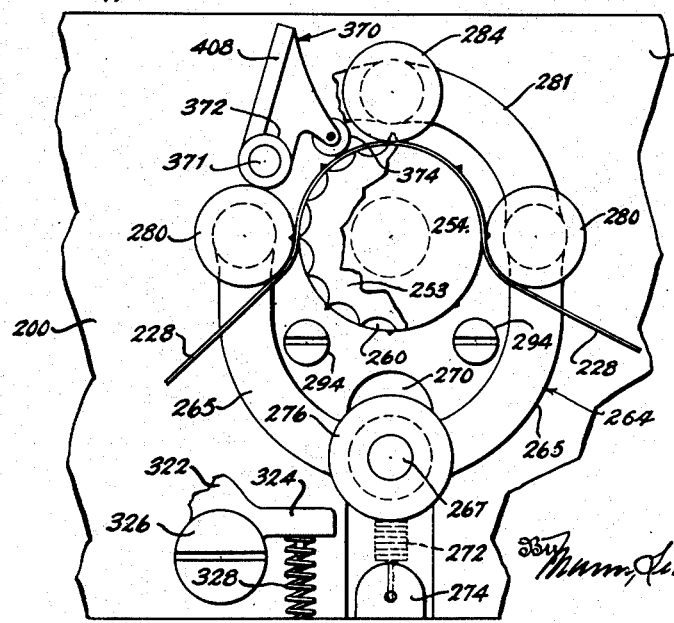
Inventor
Leon Paul Black
Attorneys June 23, 1953 　　　　L. P. BLACK 　　　　2,642,659
AUTOMATIC FACSIMILE WRITING AND DRAWING MACHINE
Filed Aug. 23, 1948 　　　　　　　　　　　　　　13 Sheets-Sheet 12
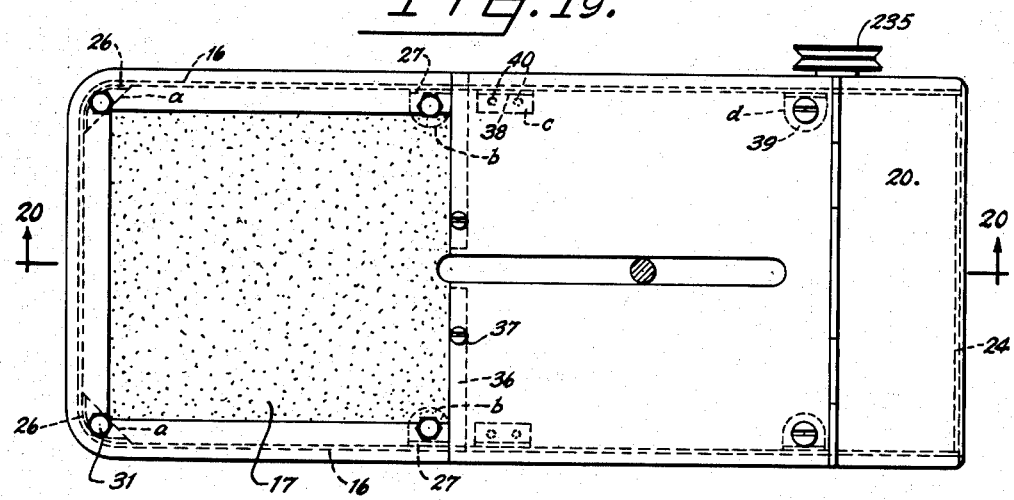
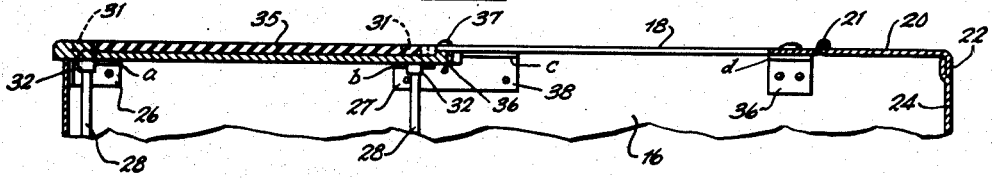
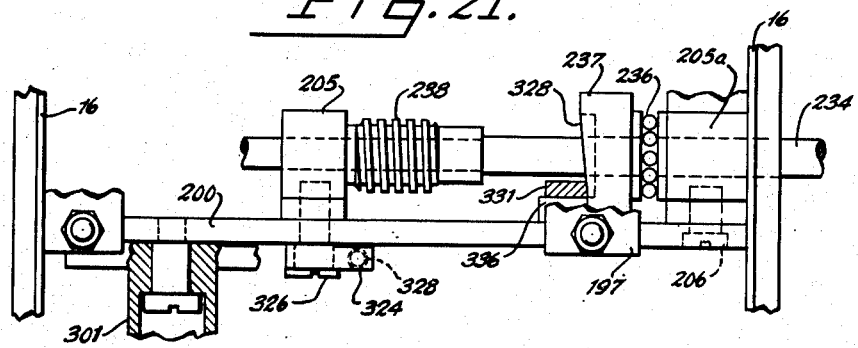
INVENTOR.
Leon Paul Black
BY
Munn, Liddy, Slocumb & Rich
ATTORNEYS June 23, 1953  L. P. BLACK  2,642,659
AUTOMATIC FACSIMILE WRITING AND DRAWING MACHINE
Filed Aug. 23, 1948  13 Sheets-Sheet 13
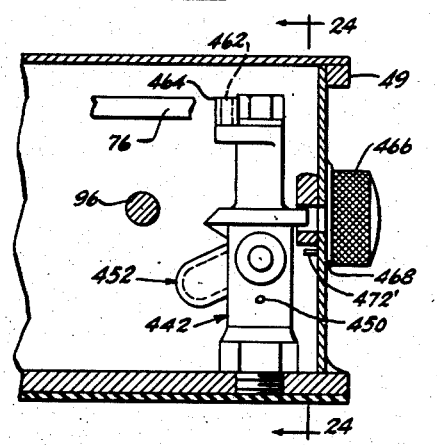
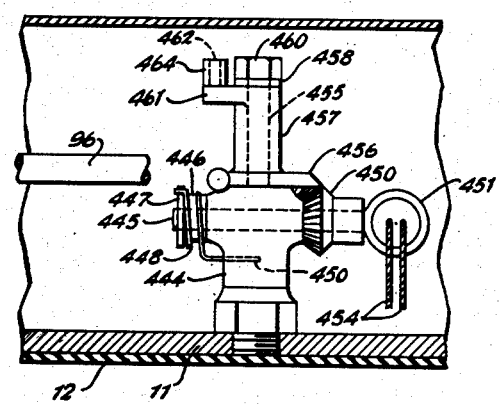
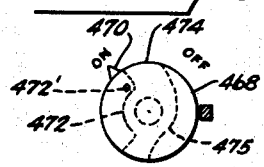
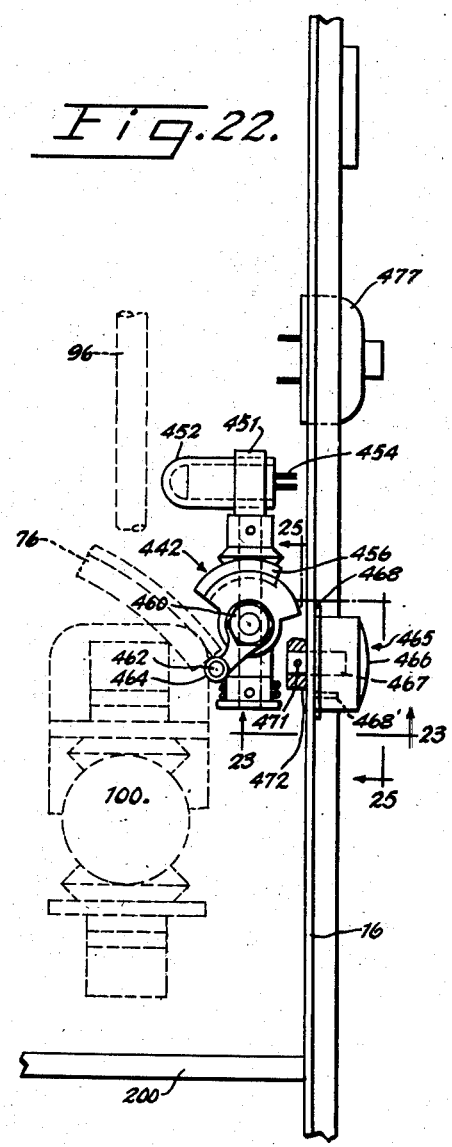
INVENTOR.
BY Leon Paul Black
ATTORNEYS Patented June 23, 1953

2,642,659

UNITED STATES PATENT OFFICE 2,642,659

AUTOMATIC FACSIMILE WRITING AND DRAWING MACHINE

Leon Paul Black, Cliffside Park, N. J.

Application August 23, 1948, Serial No. 45,728

32 Claims. (Cl. 33—18)

This invention relates to machines for automatically reproducing all such classifications of subject matter as are capable of being manually produced by such drawing or writing instruments as pens, pencils and the like.

Generally speaking, the object of the present invention is to provide a machine, of the above character, which is adapted to function with pronounced fidelity in the reproduction of all subject matter falling within the above identified classifications, and which is relatively simple in construction, especially when taking into account the nature of its intended function and the great variety of uses for which it is adapted and of which a comparatively few may be mentioned as follows: as an aid in (a) the teaching of various arts, such as that involving the drawing of cartoons, landscapes, textile designs and the like; (b) the teaching of mechanical, electrical, architectural drawings and the like; (c) the teaching of calligraphy in general, including the reproduction of such numerical, alphabetical and other characters as are customarily employed, for example, in connection with mechanical, electrical, architectural and other technical drawings; (d) the sales promotion of fountain pens and mechanical pencils; and (e) the signing of business letters, pay roll checks and various other documents in quantity lots.

To the above and other ends the invention contemplates a reproducing arm adapted to removably support a suitable writing instrument, such as a pen or pencil, the reproducing arm being mounted on a reciprocatory carriage for translatory movement therewith and pivotally connected to that carriage for oscillatory movement about its point of pivoted connection, the carriage and the reproducing arm being associated, respectively, with independently operable motion translating units, by one of which the carriage may be moved in either direction and by the other of which the reproducing arm may be swung from one position to another about its point of pivotal connection, said motion-translating units being responsively related to a control unit which includes a movable record in the form of a suitable tape structurally characterized in accordance with the subject matter to be reproduced and adapted to so influence said motion-translating units as to cause the writing instrument carried by the reproducing arm to traverse a suitable subject-receiving surface, such as a sheet of paper, and to be lifted from and lowered into contact therewith as required in graphically reproducing the subject matter as recorded on said tape.

Other objects and advantages of the invention will become apparent from the following description when taken in connection with the accompanying drawings, in which Figures 1 and 1A are plan views of the left and right hand ends of a machine embodying the invention, certain parts being omitted in the interest of clarity, the latter figure showing in detail the driving shaft and its associated elements by means of which the scribing element is moved back and forth, shifted laterally and moved vertically.

Figure 2 is a side elevation of the forward part of the machine, certain parts being shown in section, others broken away and some omitted.

Figure 3 is a view similar to that of Fig. 2, but showing the machine as it would appear from the opposite side.

Figure 3A is an end view of the machine as it would appear on the section line 3A—3A of Fig. 1A.

Figure 5 is a transverse sectional view taken substantially on the line 5—5 of Fig. 1.

Figure 6 is a transverse sectional view taken substantially along the line 6—6 of Fig. 1A, certain elements being broken away and others in the back ground being shown in dotted lines.

Figure 6A is a detail vertical sectional view taken on the line 6A—6A of Fig. 6.

Figure 7 is a plan view of so much of the machine as is related to the power amplifying mechanism for raising and lowering the pen or other writing instrument.

Figure 7A is a detail view showing the curve contact face of the stylus raising pin in relation to one of the flat faces of its controlling cam shaft.

Figure 8 is a side view of the subassembly appearing in Fig. 7.

Figure 8A is an exploded view of the parts shown in Fig. 7A as they would appear in elevation.

Figure 9 is a view showing in elevation a cam and its associated roller as employed in transmitting motion from the main shaft of the machine to the power amplifying mechanism of Figs. 7 and 8.

Figure 10 is a face view of one of the clutch disks as seen when viewed on the section line 10—10 of Fig. 14.

Figure 11 is a similar view taken on the section line 11—11 of Fig. 14 showing the second clutch-disk in phantom, the ratchets and pawls being shown in relative positions to the corresponding parts appearing in Fig. 10.

Figures 12 and 13 are views respectively similar to those of Figs. 10 and 11, but illustrating the relation of the pawls to the ratchets after the pawl-bearing disks have been moved to a substantial extent in clockwise and counterclockwise directions, respectively.

Figure 13A is a side elevation of a pair of pawls appearing in Figs. 10 to 13.

Figure 15 is a diagrammatic view illustrating the cooperative relation existing between one of the motion-translating units and the record tape of a control unit.

Figure 16 is a schematic view illustrating fragmentally a typical record tape and indicating the nature of its controlling influence in the general operation of the machine.

Figure 17 is an enlarged horizontal sectional view taken on the line 17—17 of Fig. 6, certain parts being shown in place.

Figure 18 is an enlarged vertical sectional view taken on the line 18—18 of Fig. 1A.

Figure 18A is an elevational view of the floating toggle-like unit of Fig. 18 looking in the direction of the arrow in Fig. 18, with some parts being omitted.

Figure 19 is a plan view of the cabinet with the reproducer arm removed.

Figure 20 is a longitudinal sectional view taken on the line 20—20 of Fig. 19.

Figure 21 is a fragmental plan view showing the drive shaft and reel-actuating cam.

Figure 22 is a fragmentary view showing an automatic switching unit located within the cabinet adjacent one of the motion-translating units and adapted for use in starting and stopping the operation of the machine.

Figure 23 is a fragmentary vertical sectional view taken substantially on line 23—23 of Fig. 22.

Figure 24 is a view taken substantially on the line 24—24 of Fig. 23.

Figure 25 is a view taken substantially on the line 25—25 of Fig. 22 and showing details of the switch operating knob.

Figure 26 is a side elevation of the parts shown in Fig. 6A illustrating certain details of the mechanism for driving the take-up spool.

Figure 1:
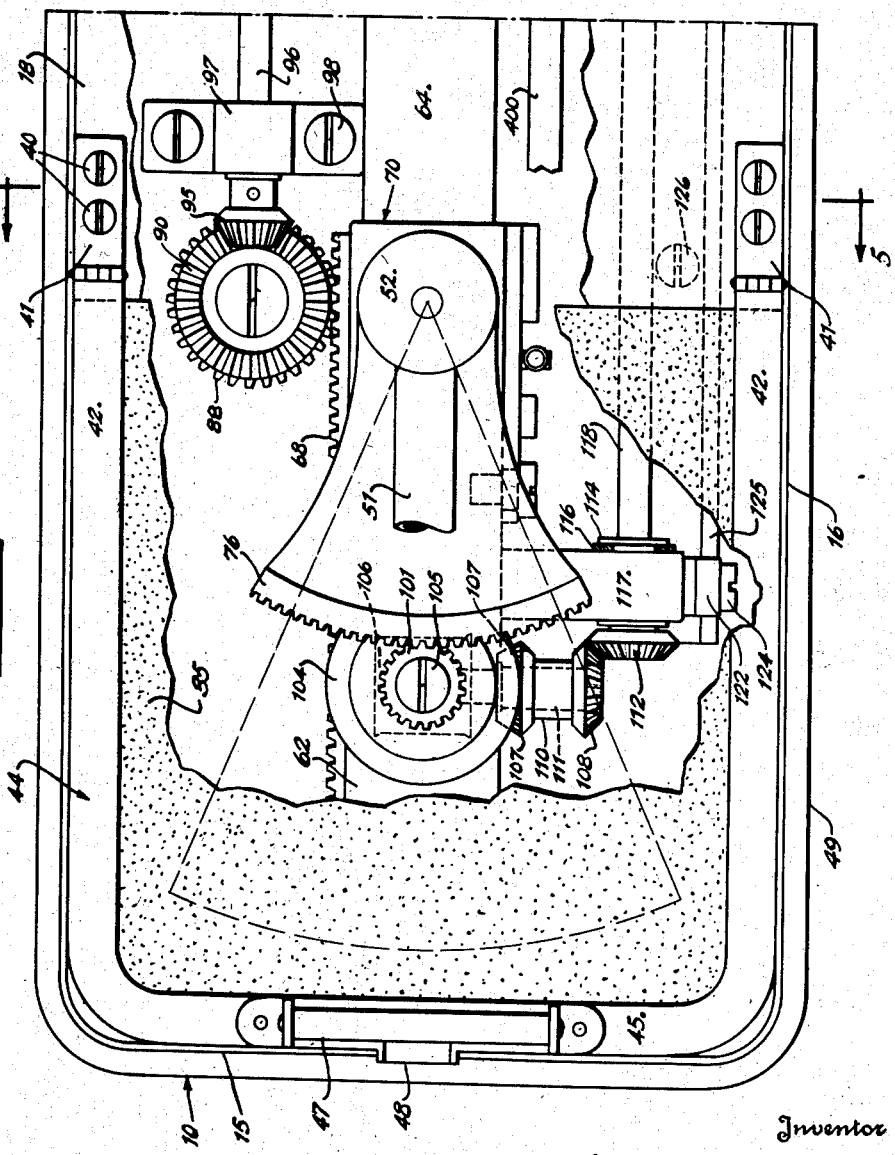

From an inspection of the drawings, especially Figs. 1 to 4, it will become apparent that the majority of the various elements entering into the machine and to be hereinafter particularly described are housed within a suitable cabinet indicated generally by the numeral 10.

The cabinet 10 includes a base 11 to the bottom surface of which may be applied a cushion 12 of suitable material such as felt or rubber. Suitably connected to the base 11, at a substantial distance from one of its ends and each of its sides, is an angle iron 14, to the vertical flange of which are connected an end wall 15 and a pair of side walls 16. In order to enhance the outward appearance of the cabinet 10, the outer margin of the base 11 may be provided with a molding 14a disposed adjacent to and suitably connected to the end wall 15 and each of the side walls 16.

The cabinet 10 further includes a cover or table, comprising a forward table section 17, a middle table section 18 and a rear table section 20, hingedly connected, as at 21, to said middle section and serving as a closure for the loading end of the cabinet. The rear section 20 is provided at its outer end with a keeper flange 22, adapted to overlie the upper margin of a door-like closure 24 for the loading end of the cabinet 10, such closure being pivotally connected, as at 25, to the base 11 and serving as a rear wall for the cabinet when normally held in its vertical or closed position by the keeper flange.

The forward table section 17, as shown in Fig. 19, is supported respectively on the horizontal flanges $a$ and $b$ of a pair of corner brackets 26 and a pair of side brackets 27 suitably connected to the side walls 6 at their upper margins. In order that the section 17 may be conveniently anchored in place, there are provided a plurality of tie-bolts 28, which pass upwardly through the base 11 and the upper or screw threaded ends of which are adapted to receive suitable retaining nuts 31, the bolt-receiving body portions 32 of which pass through the table section 17 and the flanges $a$ and $b$ of the respective brackets 26 and 27. The heads of the nuts are preferably hexagonal and are accommodated within similarly shaped sockets formed in the table section 17 and adapted to prevent the nuts from turning as the tie-bolts are screwed into the depending portions 32 of the respective nuts.

The table section 17 is recessed throughout the major portion of its area, as will be understood from an inspection of Figs. 2, 3 and 20 so as to provide a depression within which is accommodated a pad 35 of suitable shock-absorbing material, such as rubber, cork or the like on which may be supported a subject-receiving medium, such as a sheet of paper, and by which any possible damage to the point of a writing instrument may be obviated under all ordinary operating conditions.

As shown most clearly in Fig. 20, the table section 17 is cut away along its rear margin to provide a ledge 36, on which the forward margin of the table section 18 is seated and to which that section is secured, by screws 37, in a flush relation to the upper surface of the section 17. As will also be understood from an inspection of Fig. 20, especially when taken in connection with Fig. 19, the table section 18 is supported at its side margins by the uppermost horizontal flanges $c$ of the brackets 38 and the inwardly extending horizontal flanges $d$ of a pair of angle brackets 39 suitably connected to the side walls 16. The section 18 may be conveniently connected to the flanges $c$ and $d$, of the respective brackets 38 and 39, by suitable screws 40. Certain of the screws 40 may be utilized, as shown in Fig. 1, to connect a pair of hinge wings 41 (Fig. 1) to the table section 18, the hinge wings being pivotally connected to the side arms 42 of a U-shaped paper clamp 44 by which a sheet of paper, not shown, or other suitable subject-receiving medium may be held flat and securely against the upper face of the pad 35. The side arms 42 as well as the bridge section 45 of the clamp 44 are rubber faced, as shown at 46 in Fig. 3, so as to insure against displacement of the paper when in contact with the clamp.

In order to facilitate movement of the clamp 44 into and out of its clamping position, the bridge section 45 of the clamp is provided with a suitable operating handle 47. It is desirable, of course, that the clamp be held firmly in clamping position again the paper, and to this end a suitable spring latch 48 may be employed, one leg of the latch being connected to the lower face of the table section 17 and the other leg thereof which projects upwardly through such section being adapted to exert a sufficient latching influence on the clamp to hold it firmly in clamping position without unduly restricting upward manual movement thereof, as when it becomes necessary to remove one paper and introduce another. From an inspection of Figs. 19 and 20, it will be understood that the table sections 17, 18 and 20 are flush with each other and respectively project to the same extent beyond the end wall 15 and the side walls 16—16, thus lending a finished appearance to the cabinet 10 when viewed from above. However, the table sections 18 and 20, which are of equal thickness, are substantially thinner than the table section 17; and in order, therefore, to compensate for this difference in table-section thickness and thus enhance the overall appearance of the cabinet when viewed from either side thereof, each side wall 16 is provided along its upper margin with a suitable molding 49 extending throughout the combined length of the table sections 18 and 20.

Referring especially to Figs. 2 and 3, it will be noted that the machine includes, as one of its essential elements, a reproducing arm 50, which, by means hereinafter more particularly described, is adapted to be translated longitudinally of the machine in one direction or the other, swung in either direction about a vertical axis, and raised and lowered about a horizontal axis intersecting the first mentioned axis. The arm 50 comprises a tube 51 suitably connected at one end to the head portion of a supporting pin 52. The opposite end of the arm 50 is adapted for the reception of a removable holder 54, by which a suitable writing instrument, such as a fountain pen 55, may be held at the proper writing angle with reference to the surface of the paper, not shown, when held in a flat condition on the pad 35 by the clamp 44. The holder 54 includes a shank portion 56 (Fig. 2) dimensioned to snugly fit within the tube 51 where it may be locked against displacement by a knurl-headed screw 57. It is to be noted that the shank portion 56 carries a tubular chuck-like head 58 into which the pen 55, or other writing instrument, may be introduced. In order that the writing instrument may be conveniently and removably clamped within the head 58, such head is split or slotted at its upper end, as shown at 60, and is there slightly tapered so that its associated internally screw threaded clamping ring 61 when run down on the externally threaded end of the head will cause that end of the head to contract into firm gripping engagement with the writing instrument.

The above mentioned supporting pin 52 is carried by and adapted to be moved in unison with a carriage, which is indicated generally by the reference character 62, and is adapted to be moved, by means hereinafter particularly described, longitudinally of the machine in one direction or to the other according to the dictates of a control unit, also hereinafter particularly described. In order that the carriage 62 may be adequately supported and definitely guided in its longitudinal movements, there is provided an I-shaped rail 64 disposed on the longitudinal center line of the base 11 and secured thereto by a plurality of screws 65 passing upwardly through the base, as shown in Fig. 3.

Referring particularly to the carriage 62, it will be noted that its depending side flanges 66 are provided as shown in Fig. 5, with parallel grooves 67 adapted for the reception of the upper and outwardly projecting flanges of the I-shaped rail 64, the dimensional relationship of such flanges to the respective grooves 67 being such that a smooth sliding fit is afforded between the rail and its associated carriage. One of the depending side flanges 66, namely, the one appearing at the right in Fig. 5, is provided with a horizontally disposed rack 68 (Figs. 1 and 3) extending throughout the length of the carriage 62.

As shown most clearly in Fig. 2, the carriage 62 is formed at its rear with a bearing block 70, within which is journaled a vertically disposed sleeve 71, having at its lower end a flange 72 accommodated within and engaging the bottom wall of a relatively deep counterbore 74 formed in the bearing block. The sleeve 71 is connected at its upper end to the hub 75 of a sector gear 76 by a cross pin 77 and a set screw 78, shown respectively in Figs. 2 and 3. It will be readily understood, that the sleeve 71 is held against displacement longitudinally of itself by reason of the fact that its flange 72 engages the bottom wall of the counterbore 74 while the hub 75 of the sector gear 76 engages the upper face of the bearing block 70. The sleeve 71 is provided with a central opening 80 adapted for the reception of the depending shank 81 of the supporting pin 52, which shank is provided at its lower end with a contact finger 82 (Figs. 2, 7A, 8A) adapted to function, as will hereinafter more clearly appear, in that operation which is carried out in lifting and lowering the pen 55, or other writing instrument, with reference to such subject-receiving medium, as may be carried by the pad 35. As shown most clearly in Figs. 2 and 5, the supporting pin 52 is pivotally connected to the sleeve 71 by a bearing pin 84, disposed on the center line of that sleeve and intersecting the axis about which the writing instrument 55 is adapted to move as oscillatory movement is imparted to the reproducing arm 50. Here it may be well to mention the fact that the opening 80, which is adapted to accommodate the shank 81 of the supporting pin 52 is relieved at the upper end of the sleeve 71, as shown at 85, and is otherwise such with reference to the cross sectional contour of the shank as to permit the supporting pin to move slightly in one direction or the other about the bearing pin 84. Normally the supporting pin 52 is held in its position, shown in Fig. 2, by a compression spring 86, one end of which engages the inner wall of the sleeve 71 and the major portion of which is accommodated within a socket provided in the shank 81 of said supporting pin. During such time as the supporting pin 52 is held, under the action of the spring 86, in its position shown in Fig. 2, the point of the writing instrument 55, is maintained in engagement with the subject-receiving medium; but when under the action of means to be hereinafter described, the supporting pin 52 is tilted in a clockwise direction, reference being had to Fig. 2, about its associated bearing pin 84 in order to lift the writing instrument, the spring 86 will yield incident to such tilting and will therefore act on the supporting pin to return the writing instrument to its normal position, as will hereinafter more clearly appear.

Referring to Figs. 1, 3 and 5, it will be noted that the means for effecting reciprocatory movement of the carriage 62 along the rail 64 includes a pinion 88 meshing with the rack 68 carried by said carriage. The pinion 88 is suitably connected to a bevel gear 90 and is provided with a hub 91 supported on a spacing washer 92, or the like, disposed intermediate said hub and the base 11, the gear assembly including the bevel gear 90, the pinion 88 and its associated hub 91 being mounted for rotation on a vertically disposed trunnion 94 passing through the washer 92 and screw threadedly connected at its shouldered end to said base. The bevel gear 90 is maintained in driven engagement with a bevel pinion 95 carried by a horizontally disposed shaft 96, journaled at one end in a suitable bearing 97 connected to the base 11 by screws 98, the other end of the shaft 96 being journaled within a motion-translating unit 100 (Figs. 1A and 14) to be later described in detail.

As will be understood from an inspection of the left hand end of the instrument (Figs. 1 and 2) the means for effecting oscillatory movement of the reproducer arm 50 includes a pinion 101 meshing with the sector gear 76 and suitably connected to the hub portion 102 of a bevel gear 104. The gear assembly which includes the pinion 101 and the bevel gear 104 is mounted for rotation on a vertically disposed shouldered stud 105, the shouldered end of which is screwed into a lug or boss 106 (Fig. 3) with which the carriage 62 is provided intermediate its side flanges 66. The bevel gear 104 meshes with a similar gear 107, connected to a companion bevel gear 108 through the medium of a common hub 110. The gear assembly including the two gears 107—108 and their common hub 110 are journaled on a shouldered stud 111, the shouldered end of which is screw threadedly connected to the boss 106 at one side of the carriage. As shown most clearly in Figs. 1 and 2 the bevel gear 108 meshes with a similar gear 112, having a relatively long hub 114 provided at one end thereof with a peripheral groove adapted for the reception of a split retaining ring 116. The hub 114 is journaled in the outer or bearing end of a supporting arm 117 secured to the carriage 62 and extending outwardly at right angles thereto, the hub 114 and its associated gear 112 being held against longitudinal displacement with reference to the bearing end of the supporting arm by reason of the fact that the gear 112 and the split ring 116 are located at opposite sides of said arm. The gear 112 and its relatively long hub 114 are carried by a horizontally disposed shaft 118, to which the hub and its associated gear are so splined, as by a key carried by said hub and arranged to traverse a key-way 120 formed in said shaft, that the gear is adapted to be driven by that shaft and to move longitudinally thereon as the carriage 62 traverses the rail 64. It will be understood from the foregoing that the shaft 118 is in the hub of the gear 112 and that the gears 104, 107, 108 and 112 are maintained in a definite meshing relation despite any longitudinal displacement that the gear 112 may undergo with reference to the shaft 118, which, at its rear end is journaled within a motion-translating unit 100' (Fig. 2A) which is identical with the above mentioned motion-translating unit 100 and is independently operable with respect thereto.

In order that the carriage 62 may be effectively held against any such torsional displacement as may cause it or any of its associated gears to bind during operation of the machine, the supporting arm 117 is provided at its bearing end with a roller 122, carried by a shouldered stud 124 screwed into the end of the supporting arm and serving as a bearing for the roller which is adapted to engage and traverse the upwardly extending flange of an angle rail or guide track 125 suitably connected to the base 11 as by screws 126.

Inasmuch as the independently operable motion-translating units 100 and 100' are identical, it is deemed advisable, in the interest of brevity, to describe only the unit 100 in detail, using such reference characters as may be necessary with the understanding that such characters will be primed in connection with the unit 100' to denote such parts or elements thereof as may be duplicates of those embodied in the unit 100.

Figure 14:
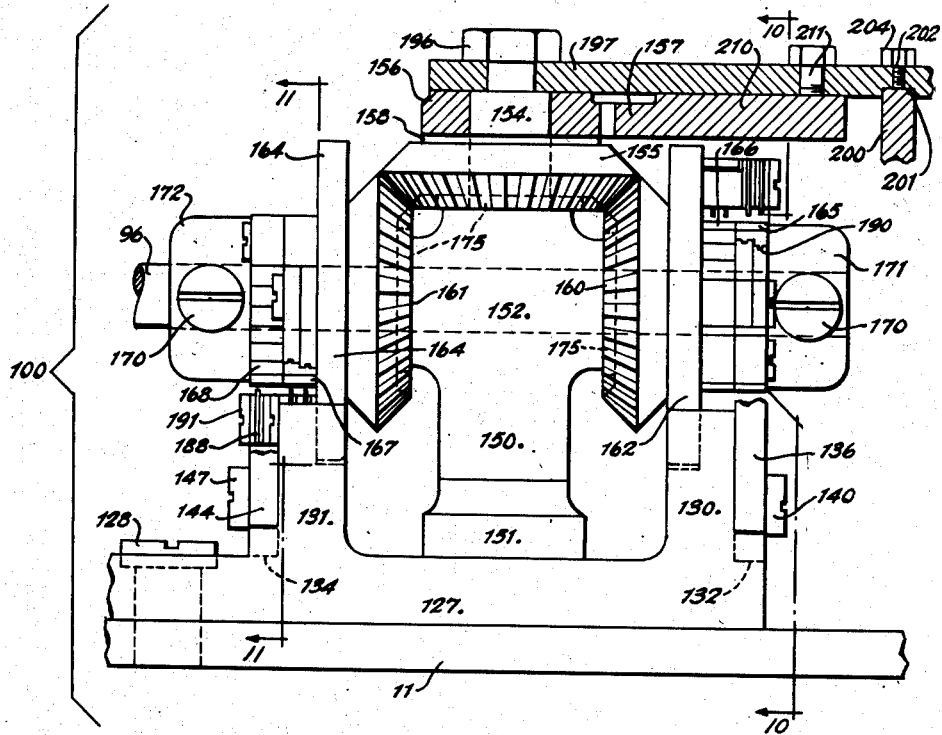
Figure 14 is a view showing in elevation a motion translating unit, embodying the clutches appearing in Figs. 10 to 13.

Referring to the unit 100 shown in Fig. 14 on an enlarged scale it will be noted that such unit includes a base plate 127 suitably connected to the base 11 of the cabinet 10, as by screws 128, and provided with a pair of vertically disposed cam-block supports 130 and 131 arranged in a spaced parallel relation to each other and provided respectively with arcuate cam-block seats 132 and 134 on their outer faces (Figs. 10-13). Referring particularly to Figs. 10 to 13 it will be noted that on the seat 132 are arranged a pair of cam blocks 135 and 136, the lower ends of which conform in curvature to that of the seat 132 and the upper ends of which respectively present a pair of cams 137 and 138. The cam-blocks 135 and 136 are secured to the support 130 by suitable screws 140 passing through holes 141 provided in said cam blocks, the holes being elongated to permit said blocks to be adjusted on the seat 132 so as to insure proper operating positions of the cams 137 and 138. On the cam block seat 134 are disposed a pair of cam blocks 142 and 144, which are arranged in positions corresponding respectively to the positions occupied by the cam blocks 135 and 136. The lower ends of the cam blocks 142 and 144 conform in curvature to that of the seat 134, and their upper ends, respectively, present a pair of cams 145 and 146 which, for reasons that will hereinafter more clearly appear, are located well above the corresponding cams 137 and 138. The cam blocks 142 and 144 are secured to the support 131 by suitable screws 147, passing through holes 148 provided in the cam blocks, which holes, like the holes 141, are elongated to permit said blocks to be adjusted on the seat 134 so as to insure proper operating positions of the cams 145 and 146.

Referring especially to Fig. 14, it is to be observed that intermediate the cam-block supports 130 and 131 is disposed an upright cross-like bearing post 150, the shank portion of which at its shouldered end 151 is screwed into the base-plate 127 and the head portion 152 of which serves as a horizontal bearing in which the shaft 96 is journaled. Projecting upwardly from the head portion 152 is a reduced portion 154 on which is journaled a bevel gear 155 having a thickened hub 158, carrying on its upper face a sector gear 156 meshing with a larger sector gear 157, hereinafter more particularly described.

Rotatably supported on the shaft 96 and meshing with the bevel gear 155 are a pair of bevel gears 160 and 161 to which are respectively connected a pair of disks 162 and 164. Also carried by the shaft 96, are two pairs of ratchet wheels 165—166 and 167—168, the former of which are disposed adjacent to the disk 162 and the latter of which are disposed adjacent to the disk 164. To the shaft 96 are connected, as by set screws 170, a pair of collars 171 and 172 which are in turn locked respectively to the ratchet wheels 165—166 and 167—168 by suitable pins 174 so that said ratchet wheels and said collars are adapted to turn in unison with the shaft on which they are carried. Between the bearing post 150 and the respective gears 160 and 161, are interposed a pair of bearing washers 175 against which said gears are adapted to rotate. As will be understood, the washers 175, as well as the hub 158, serve to reduce friction as between the bearing post 150 and the several gears 155, 160 and 161 and may be accurately dimensioned, as to thickness, to obtain nicety in the meshing fit of one gear to another.

As shown most clearly in Figs. 10 to 13, the teeth of the ratchet wheel 165 project in an opposite direction to those of the ratchet wheel 166, and, likewise, the teeth of the ratchet wheel 167 project in an opposite direction to those of the ratchet wheel 168. Referring further to Figs. 10 to 13, it will be observed that with the ratchet wheels 165, 166, 167 and 168 there is, respectively associated a pair of pawls 176—177, 178—179, 180—181 and 182—183, the first two pairs of which are carried by the disk 162 and pivotally connected thereto by shouldered studs 184 screwed into that disk and the latter two pairs of which are carried by the disk 164 and pivotally connected thereto by shouldered studs 185. Of the pawls just mentioned those identified by the numerals 177, 179, 181 and 183 are longer than their companion pawls to the extent of one-half ratchet tooth in order that the teeth of the several ratchet wheels 165 to 168 may be relatively coarse for the sake of strength and yet, in effect, relatively fine so as to attain smooth and delicate increments of rotation of the shaft 96 in response to the driving action of the pawls 176 to 183. It is to be noted that the hub portions of the longer pawls 177, 179, 181 and 183 are provided with tripping lugs 186 (Fig. 13A) which project from the ends thereof next adjacent the shorter pawls 176, 178, 180 and 182 in an overlying relation to their respectively associated trigger-like lugs 187 which are carried by and project radially from the hub portions of said shorter pawls. From an inspection of Figs. 10 to 13, it will be understood that in the event any one of the longer pawls 177, 179, 181, 183 is so pivotally moved on its associated disk 162 or 164, as the case may be, that it is rendered ineffective as a ratchet-driving element its associated shorter pawl, either 176, 178, 180 or 182 as the case may be, will be similarly moved under the influence exerted on its tripping lug 186 by the cooperatively related trigger-like lug 187.

In order that the pairs of pawls 176—177, 178—179 180—181 and 182—183 may be moved into engagement with the respective ratchet wheels 165, 166, 167 and 168 as required during operation of the machine, there are provided a plurality of springs 188, of the cantilever type, the free ends of which are adapted to operate within relatively shallow grooves 190 formed in the pawls, as shown in Fig. 14, and the other ends of which are mounted on and suitably anchored with respect to a pair of spring-retaining studs 191 carried by the respective disks 162 and 164.

As shown most clearly in Figs. 10 to 13, the longer pawls 177, 179, 181 and 183 are provided at their respective ends or extensions with rollers 192 to 195 which are adapted to engage and cooperate with the respective cams 137, 138, 145 and 146 in lifting the pawls 176 to 183 out of their ratchet wheel driving positions as required during operation of the machine.

As shown most clearly in Fig. 14, the upper or shouldered end of the trunnion 154 is secured, as by a nut 196, to the outer end of a horizontally disposed supporting plate 197, the other end of which is grooved, as shown in Fig. 18, to snugly receive the upper marginal portion of a vertical wall plate 200, extending transevrsely of the cabinet 10 and accommodated within a retaining groove 201 provided in the base thereof. As will be understood from an inspection of Figs. 14 and 18, the plate 200 is provided with an upwardly extending screw threaded stud 202 projecting through the supporting plate 197 and provided with a nut 204 by which the plate may be firmly anchored in position.

Figure 1A:
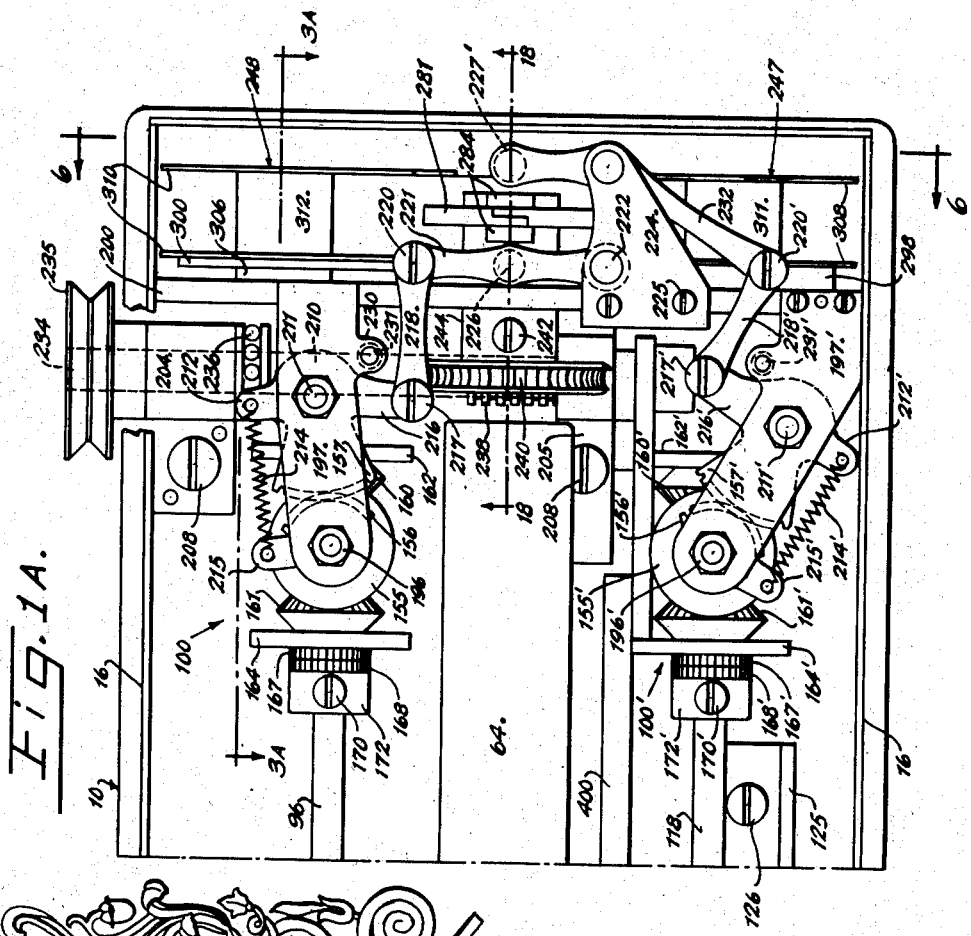
Figure 28:
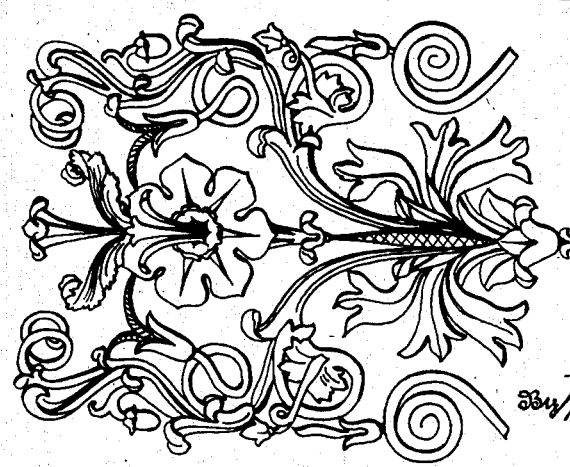
Figure 28 is a portrayal of a conventional design illustrating the type of work an instrument embodying my invention is capable of reproducing.

Referring again to Fig. 14, while also considering Fig. 1A, it will be noted that the sector gear 157 is carried by an arm 210 which is pivotally connected, as by a bearing stud 211, to the supporting plate 197, which is provided with a laterally extending ear 212, to which one end of a tension spring 214 is anchored, the other end of the spring being connected to a laterally extending ear 215 projecting from the segmental gear 156 so that said spring will at all times tend to move the segmental gears 156 and 157 in clockwise and counterclockwise directions, respectively, when viewed from above as in Fig. 1A. As shown most clearly in Fig. 1A, the gear-carrying arm 210 is provided with a laterally extending lever 216, pivotally connected, as by a shouldered stud 217, to one end of an operating link 218, the other end of which is pivotally connected, as by a shouldered stud 220, to the free end of a record-responsive actuating lever 221, the opposite end of which is pivotally connected, as by a shouldered stud 222, to the lower face of the horizontal flange of an angle plate 224, the vertical flange of which is secured to the vertical wall plate 200 by suitable screws 225 appearing most clearly in Fig. 6. At a point substantially midway of its length, the lever 221 is provided, as shown in Fig. 18, with a depending stud 226 on which is journaled a contact roller 227 normally held, under the action of the tension spring 214, in contact with one edge of a ribbon-like record 228, to be hereinafter particularly described. As shown most clearly in Fig. 1A, the longitudinally disposed supporting plate 197 is provided with another laterally extending ear 230 to which is secured a shouldered pin 231, serving as a stop with which the lever 216 is adapted to engage when moved to a maximum extent under the action of the tension spring 214, the pin 231 being so positioned that when the lever 216 engages it the roller 227 will be located at its maximum operating extent in relation to the center line of the record 228, so as not to interfere with the record, having portions at the beginning and the end of each roll with side edges cut to the maximum depth, as it is being introduced into or removed from the machine.

Here it may be well to mention the fact that of all the elements above described as included in the motion-translating unit 100, only one, namely the lever 221, differs from the corresponding element included in the motion-translating unit 100' and shown most clearly in Fig. 1A as a lever 232. In this connection it will be noted that the lever 232 differs from the lever 221 in that it is relatively longer, in that it is pivotally connected to the angle plate 224 at a point intermediate its ends, and in that its associated roller 227' is connected to that end of the lever which is opposite the end that is pivotally connected to the operating link 218' of the motion-translating unit 100'.

Figure 2A:
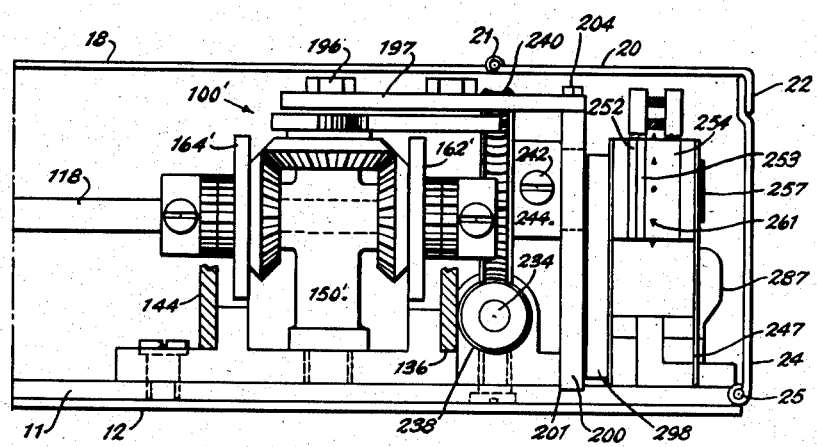
Figure 2A is a detail view showing in elevation and in vertical section various elements included in the rear part of the machine.

In order that a suitable source of power, such as an electric motor not shown may be utilized in operating the machine, there is provided a power transmitting shaft 234, shown most clearly in Figs. 1A, 2A, 3A, 7 and 21, which is journaled in the bearings 205 and 205ª and extends somewhat beyond one of the side walls 16 of the cabinet 10 where it is provided with a pulley 235 adapted to be connected to an electric motor adapted for use as a driving medium. The shaft 234 is provided with a suitable thrust bearing 236, preferably of the ball-type, located adjacent to the bearings 205ª and held against longitudinal displacement by a cam 237 secured to the shaft, as shown most clearly in Fig. 21 and adapted to function in the manner hereinafter particularly described. It will be noted that the shaft 234 in the vicinity of its associated bearing 205 is of reduced diameter and is there provided with a worm 238, meshing with a worm gear 240, which, as shown in Figs. 1A and 2A, is carried by a relatively short horizontally disposed shaft 241 to which the worm gear is connected by a set screw 242 carried by its associated hub portion 244. As will be understood from an inspection of Fig. 18, the shaft 241 is journaled in a bearing 245, one end of which is threaded into the vertically disposed wall plate 200. Referring to Fig. 18, it will be noted that the bearing 245 is cut away at the top, as shown at 246, to provide operating clearance for the roller 227 carried by the actuating lever 221 and adapted to engage one edge of the ribbon-like record 228 as it is transferred from its supply reel 247 to its receiving reel 248 in the manner hereinafter more particularly described. Mounted on the shaft 241 and locked thereto by a suitable key 250 is a record-feeding unit 251 comprising a pair of rings 252—253 and a feed roller 254 (Figs. 2A, 17 and 18), adjacent to the latter of which is provided a bearing post 255 connected at its lower end to the base plate 11 of the cabinet 10 and affording at its upper end a bearing 256 for the outer end of the shaft 241 which latter is provided with a head 257 functioning in conjunction with the hub 244 of the worm gear 242 to retain said shaft against longitudinal displacement.

Noting Figs. 17 and 18, it will be seen that the bearing 256 at the upper end of the bearing post 255, is also cut away, as shown at 258, to provide an operating clearance for the roller 227' carried at the outer end of the actuating lever 232 and which engages the outer edge of the ribbon-like record 228 as it is transferred from the supply reel 247 to the receiving reel 248. The upper portion of the bearing post 255 is of a radial dimension equal to that of the bearing 245 and the upper portion of these two bearings serve to support the over-hanging margins of the ribbon-like record 228 against undue distortion in the vicinity of the record-engaging rollers 227 and 227' as the record passes over the feeding unit 251. In order to obviate undue friction between the moving record 228 and the stationary bearings 245 and 256, the radius of each of these bearings is .002" less, than the radius of the feed roller 254 and each of its associated rings 252 and 253. It will be observed that the ring 253, which is of the same diameter as the ring 252 and the feed roller 254, is provided on its periphery with a plurality of equidistantly spaced scallop-like indentures 260 and that the feed roller 254 is provided on its periphery with a series of equidistantly spaced prong-like driving teeth 261, the indentures 260 (Fig. 6) being adapted to function in connection with control means, to be hereinafter described, for lifting and lowering the writing instrument 55 in accordance with the requirements of the record 228 which, as shown in Fig. 15, is provided along its longitudinal center line with a series of apertures 262 adapted to progressively receive the driving teeth 261 of the feed roller 254 so that a positive driving action may be exerted on the record as the feed roller is rotated in a clockwise direction as viewed in Figs. 4 and 6.

Figure 4:
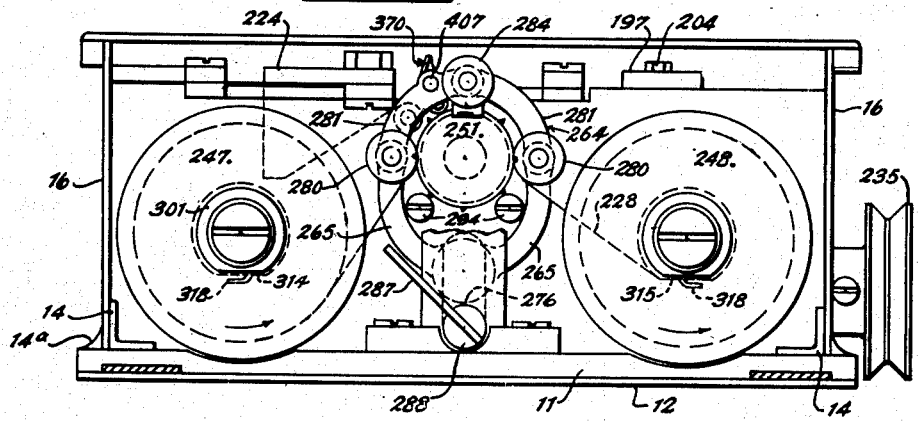
Figure 4 is a detail end view showing in elevation various elements of the record feeding unit.

In order that the ribbon-like record 228 may be held in intimate contact with the face of the feeding unit 251 so as to insure against failure of the driving teeth 261 to properly enter the apertures 262 of the record, there is provided a floating toggle-like roller unit, indicated as a whole by the numeral 264 in Figs. 4, 6 and 18A and affording three-point pressure contact as between itself and said record. As will be understood from an inspection of Figs. 17, 18 and 18A, when considered in connection with Figs. 4 and 6, the roller unit 264 includes a pair of arcuate shaped arms 265, the lower overlapping ends of which are appropriately cut away, as will be understood from Fig. 18, so that the remaining portions of the arms, as will be seen in Fig. 17, will occupy aligned positions of engagement with the adjacent face of the vertically disposed wall-plate 200, with reference to which they are adapted to be vertically or slidably displaced, as will hereafter more clearly appear.

Considering Figs. 18 and 18A, it will be noted that the arms 265 are pivotally connected to each other, at their lower overlapping ends, by a pin 267, on which is mounted a collar 268 of such outside diameter that it is adapted to somewhat freely fit for vertical movement within an elongated slot 270 formed in the lower margin of the wall plate 200. The pin 267 and its associated collar 268 are provided with registering openings 271 adapted for the reception of the upper end of a tension spring 272 (Fig. 6), the lower end of which is connected to a screw eye 274 located in the lower end of the slot 270 and attached to base plate 11 of the cabinet. The outer end of the pin 267 is provided with a head 275, between which and the adjacent arm 265 is carried a roller 276. It is to be noted that since the outer end of the roller 276 is adapted to slidably engage the adjacent face of the bearing post 255 and since the space afforded between that post and the wall plate 200 accurately accommodates the arms 265 and said roller, such arms will be held at all times in a proper face-to-face contact with the wall plate 200 to permit their being raised and lowered in unison with the vertically movable pin 267 which is held at all times in a perpendicular relation to the wall plate by reason of the face-to-face contact that is maintained between it and said arms.

It will be understood from an inspection of Figs. 4 and 6, in conjunction with Figs. 17 and 18A that each of the arcuate shaped arms 265 is provided at its upper end with an outwardly projecting horizontally disposed shouldered pin 277, on one bearing portion of which is carried a roller 278 and on another or somewhat smaller bearing portion of which is carried a similar roller 280, which is held in place on said pin by a retaining collar pened or otherwise suitably connected thereto. The rollers 278 and 280 are normally disposed on substantially the horizontal center plane of the feed-roller 254 and are adapted to there engage the ribbon-like record 228 along a relatively wide path at each side of the series of apertures 262. The rollers 278 and 280 are spaced from each other a substantial distance in order to permit unobstructed passage of the teeth 261 of the feed roller 254 during operation of the machine. The spaces afforded between the respective pairs of rollers 278 and 280 are adapted to accommodate the lower ends of a pair of arcuate shaped arms 281 which are pivotally connected to the smaller bearing portions of the respective shouldered pins 277 and are thus, in effect, pivotally connected to the respective arms 265. The upper ends of the arms 281 are respectively reduced in thickness by one half, so that their combined thickness equals the thickness of each arm at the lower end thereof where it is connected to its associated shouldered pin 277. As shown most clearly in Fig. 18, the upper ends of the arms 281 overlap each other and are pivotally connected to each other by a pin 282 passing therethrough. The pin 282 carries on its projecting ends a pair of rollers 284 which are spaced from each other to accommodate therebetween the overlapping ends of the arms 281. The rollers 284 and their associated pin 282 are held together as a unit on the arms 281 by reason of the fact that such pin is provided at one end with a head 285 and carries at its other end a suitable retaining washer 286, said head and washer being accommodated within the counterbored faces of said rollers.

It will be noted that the space afforded between the rollers 284 is such as to permit unobstructed passage therethrough of the teeth 261 of the feed roller 264, and that the upper ends, like the lower ends, of the arms 281 are so spaced with reference to the feed roller as to allow its teeth to pass unobstructedly under said arms at all times during operation of the machine.

From the foregoing description of the floating roller unit, it will be understood that such unit during operation of the machine will exert pressure on the ribbon-like record 228 at three points of engagement therewith and thus hold it in intimate contact with the feeding unit 251 inasmuch as the tension spring 272, acting downwardly on the vertically movable unit, will cause the rollers 284 to engage the record at the top of the feed roller 254 and will at the same time so urge the arms 265 and 281, respectively, toward each other as to cause the rollers 278 and 280 to engage the record in the vicinity of a horizontal plane passing through the axis of the feeding unit.

In order that the roller unit 264 may be conveniently lifted against the action of the spring 272 so as to move the rollers 278, 280 and 284 well out of their contact position to permit the record 228 to be readily placed in or removed from its operating position, there is provided a manually operable lever 287, the lower or hub portion 288 of which is accommodated within a notch 290 formed in the base of bearing post 255, as shown in Fig. 4. The hub portion 288 of the lever 287, is provided with a horizontal shaft 291 journaled in the lower end of the bearing post 255 and provided at its inner end with a cam 292 fixed to said shaft. The cam 292 is so related to the roller 276, which constitutes an element of the roller unit 264, that when the lever 287 is positioned as in Fig. 4 the cam will be disengaged from the roller, thus permitting the spring 272 to maintain the rollers 278, 280 and 284 in record-engaging positions. However, by moving the lever ninety degrees to the right the cam 292 will so act on the roller 276 as to lift the roller unit 264 to such an extent that the rollers 278, 280 and 284 will be moved well out of their respective record-engaging positions, it being noted in this connection that as such unit is lifted the arms 265 will engage along their inner curved surfaces with a pair of diverting studs 294, carried by the wall plate 200, and will be cammed outwardly by such studs, against the action of the spring 272, to displace the rollers 278 and 280 while the arms 281 are being moved upwardly to displace the rollers 284.

The ribbon-like record 228 (Figs. 15 and 16) is preferably made of tempered steel .003″ in thickness and approximately ⅝″ in width, and, as previously stated, is transferred from the supply reel 247 to the receiving reel 248, the latter being rotated step-by-step in response to the operation of suitable driving means. These reels are indirectly supported on bearing studs 294 and 295 which are substantially identical, details of which are shown in Fig. 3A. Their supporting studs 294 and 295 are screwed into the wall-plate 200 and are each provided with a shouldered bearing portion 296 having at its outer end a head 297. The bearing portions of these studs respectively carry a pair of disks 298 and 300 (Fig. 1A), the hub portions 301 and 302 of which are relatively long and are counterbored, as shown at 304, to receive said heads 297 and are also provided with slot-like openings, as shown at 305.

In Figs. 1A and 3A, it will be noted that the disk 300 is somewhat thinner than the disk 298 in order to accommodate between it and the wall plate 200 a ratchet wheel 306, which is connected to said disk and by means of which it is rotated. The reels 247 and 248 are removably carried by the hub portions 301—302 of said disks 298—300 and, as shown in Fig. 1A, respectively include a pair of side flanges 308 and 310 connected in a spaced relation by hubs 311—312 which are so formed as to present flat areas 314—315 in Fig. 4. These hubs are complementary to, and are adapted to fit the respective hub portions 301—302 of the disks 298—300, and, each of them has a suitable spring-like locking detent 316 and a laterally extending record-engaging finger 318. As shown in Fig. 4, the fingers 318 are respectively located in the vicinity of the flat areas 314—315 of the reel hubs 311—312 and at points substantially diametrically opposite the detents 316. Mention is made of the fact that since the hubs 311—312 are provided with flat areas 314—315 and are complementary to the hub portions 301—302 of the disks, the reels 247—248, when placed on said hub portions are effectively locked for rotation therewith. Moreover, since the record-engaging fingers 318 are carried at the flat areas 314 and project only a relatively slight distance therefrom, it follows that the record 228 may be wound on each of the reels without the possibility of a hump occurring in the record at the point where its convolutions pass over said fingers. Additionally, it is to be noted that as the reels 247—248 are placed on the hub portions 301—302, the spring-like detents 316 will snap into locking position within the openings 305 formed in said hub portions and there serve to hold the reels against undue removal although, because of their spring-like nature, permitting the reels to be removed when desired.

One end of the ribbon-like record 228 may be anchored to the supply reel 247 by introducing its record-engaging finger 318 into, for example, the aperture 262 nearest that end of the record preparatory to winding it onto the supply reel. The opposite end of the record may be similarly connected to the receiving reel 248. Hence it follows that if such reel is rotated in the direction of the arrow shown thereon in Fig. 4 and in a proper speed relation to the feeding unit 251 the record will be properly wound onto said receiving reel as it is unwound from the supply reel 247.

In order that the proper transfer of the record 228 from the supply reel 247 may be effected, it is required that proper tension be maintained in the record at both sides of the feeding unit 251—in other words, there should be no substantial slack in the record between the reel 247 and said feeding unit nor should there be any excessive tension between the feeding unit and the receiving reel 248. In the first instance, any substantial slack would interfere with the feeding operation of the feeding unit 251, and in the latter instance the apertures 262, provided in the record 228 for the reception of the feeding unit teeth 261, would soon become distorted, thus impairing the operation of the machine.

In order that the record 228 may be properly tensioned, as between the supply reel 247 and the feeding unit 251, a suitable brake is provided, which, as shown in Fig. 6 is a bell crank lever including a pair of arms 322 and 324, said brake being loosely mounted on the shouldered screw 326 projecting from the wall plate 200. The arm 322 is provided with a friction tip 327, such as fibre or the like, adapted to engage the periphery of the disk 298 under pressure exerted by a compression spring 328 acting upwardly against the arm 324 and tending to move the brake 322 in a counterclockwise direction, as viewed in Fig. 6.

The driving mechanism by which the receiving reel 248 is so rotated as to maintain a proper degree of tension between that reel and the feeding unit 251, includes the before mentioned cam 237 (Fig. 21) carried on the shaft 234. This cam is so formed that its side face presents an inclined cam surface 328 adapted to cooperate with a bell crank lever 330 (Fig. 6) having a pair of arms 331 and 332 pivotally supported on a shouldered stud 335 (Fig. 3A) screw-threadedly connected to the vertical wall plate 200. The lower end of the arm 331 is provided with a roller 336, engaging the cam surface 328; and the arm 332 is provided at its outer end with a shouldered stud 337, by which that arm is pivotally connected to a depending link 338. The link 338, as shown in Fig. 6A, is provided at its lower end with an elongated slot 340, adapted for the reception of a pin 341, carried at the outer end of an oscillatory lever 342, pivotally supported on the reduced shank portion 344 of the stud 295 on which the disk 300 and the reel 248 are rotatably supported, the lever 342 being held against undue removal from the stud 295 by a retaining collar. The pin 341 projects through a slot 346, provided in the wall plate 200, as shown in Fig. 6A. From Fig. 6 it will be noted that the rear end of the pin 341 pivotally supports a spring pressed pawl 347 disposed in alignment with the ratchet wheel 306, which is carried by the stud 295 and is adapted to be moved in a counterclockwise direction under the influence of said pawl as its associated pawl-carrying lever 342 is moved upwardly about its point of pivotal connection with the stud 295.

Considering the cam 237, it will be noted that its relation to the bell-crank lever 330, the link 338 and the pawl-carrying lever 342 is such that the latter lever is forcibly moved only downwardly under the action of the cam, thus leaving that lever free to be moved upwardly under the action of a suitable tension spring 348, shown in Figs. 6 and 6A. The lower end of the spring 348 is connected to the pawl-carrying lever 342, at 350, and is likewise connected to the arm 332 of the bell crank lever at 351.

In order that the roller 336 carried at the lower end of the arm 331, which constitutes an element of the bell-crank lever 330, may be held at all times in contact with the cam 237, there is provided a tension spring 352, the lower end of which is suitably connected to the outer end of the arm 332, as by looping it around the shouldered stud 337, and the upper end thereof being connected to the outer end of a tensioning lever 354. The tensioning lever 354 is pivotally connected to the wall plate 200 by a stud 355, adjacent to which said lever is provided with a contact lug 356 disposed beneath an adjusting screw 367 carried by the supporting plate 197. The tension of the spring 352 may be readily varied by vertically adjusting screw 367 to maintain proper contact of the roller 336 with the cam 237 at all times.

In considering the operation of the above described mechanism by which the receiving reel 248 is rotated step-by-step, it will be noted that the pawl-carrying pin 341, operating within the slot 340 of the link 338, is adapted for movement within that slot to the extent of the slot-length, but due to the action of the tension spring 348 the pin 341 is normally maintained in engagement with the upper boundary edge of said slot. Thus, normally for each revolution of the cam 237, the pawl-carrying lever 342 will be moved downwardly from its uppermost position to the extent provided for according to the full throw of said cam and returned to its uppermost position under the action of the spring 348, the pawl 347 being adapted to partially rotate the ratchet wheel 306 and thereby correspondingly rotate the receiving reel 248 in a counterclockwise direction, as viewed in Fig. 4, to take up the record 228 as it passes over the feeding unit 251. So long as record 228 remains reasonably slack along its length between the feeding unit 251 and the receiving reel 248, the intermittent operation of the driving mechanism by which said reel is rotated will continue in the manner just described; but as soon as the record becomes tensioned to a predetermined extent such operation becomes automatically modified. In further consideration of this connection let it be assumed that, as the pawl-carrying lever 342 is being moved upwardly under the action of the spring 348, tension in the record 228 is built up to such extent as to overcome the action of said spring, then in that event the pawl-carrying lever remains stationary and consequently rotation of the receiving reel 248 is discontinued even though operation of the bell crank lever 330 is continued without interference due to the lost motion connection afforded between the pawl-carrying pin 341 and the lower end of the link 338 by reason of the presence of the elongated slot 340 within which said pin is accommodated. It will be understood, of course, that as the tension within the record 228 is sufficiently reduced incident to further delivery of the record by the feeding unit 251, the spring 348 acting on the pawl-carrying lever 342 will function to complete the step of rotation earlier initiated with respect to the receiving reel 248 under the driving action of the pawl 347 and the normal operation of the mechanism by which step-by-step rotation of said receiving reel is effected will be resumed and thereafter continued until such time as sufficient tension is built up in the record 228 to automatically modify the operation of said mechanism in the manner above described.

My invention further includes the provision of means for lifting and lowering the pen 55, or other writing instrument, with respect to the paper, in order that the subject matter, as recorded on the record 228, may be reproduced with great fidelity. Examples accomplished by this action of raising and lowering the writing instrument are found in the reproduction of a period, a comma, a dotted "i," a crossed "t," and when starting a new word or a new line.

To the above ends the record 228 is provided, at such spaced intervals as may be necessary, with as many control apertures 368 as may be required in recording the subject matter to be reproduced. The apertures 368 are for the control of a trip-lever 370 (Fig. 18A) suitably connected to a relatively short shaft 371, journaled in a bearing 372 carried at the upper margin of the wall plate 200, see also Fig. 8. One end of the trip-lever 370 is provided on its under side with a feeler-roller 374 normally riding on the upper face of the record 228 as it passes over the feeding unit 251 and which moves into and out of one or another of the scallop-like indentations 260 with which the ring 253 of said feeding unit is provided, whenever a control aperture registers therewith as such apertures are successively brought into their control positions. It is also noted that the control apertures 368 bear the same spaced relation to the tooth-receiving apertures 262 that exists between the scallop-like indentations 260 and the driving teeth 261 of the feeding unit 251, thus insuring proper registration between any one of said control apertures and one or another of said indentations as the record 228 passes over said feeding unit in its course of travel from the supply reel 247 to the receiving reel 248.

Figures 6 and 8 show that the shaft 371, to which the trip arm 370 is attached, carries a sector gear 375, the hub portion of which is suitably connected to said shaft as by a pin 376 shown in Fig. 8. The sector gear 375 meshes with a similar gear 377, pivotally connected to the wall plate 200 as by a shouldered stud 378 screwed into that plate. The sector gear 377 is provided with a downwardly extending latch-arm 380, the lower end of which is adapted to cooperate with the power amplifying means employed in raising and lowering the writing instrument 55.

The above mentioned power-amplifying means is shown in detail in Figs. 7 and 8. It includes a cam 381 keyed to the shaft 234 at a point adjacent the bearing 205 which engages a cam-roller 382, connected by a stud 384, to a horizontally reciprocating cam follower 385. The latter is pivotally connected at its forward end by a shouldered screw 386, to one arm 387 of a bell crank lever 388 and is slidably supported at its other end on a roller 390, carried by shaft 234 and accommodated within an elongated opening 391 provided in said follower. In order that proper driving relation may be effected between the cam 381 and the follower 385 I provide thereon a roller 382 with which the cam engages to move it in one direction against the tension of a spring 392, one end of which is connected to said follower, by a pin 394, its other end being anchored to the base plate 11 by a screw eye 395. From the relationship existing between the cam 381, roller 382, follower 385 and spring 392, it will be understood that said follower is moved forwardly under the action of said cam and returned in an opposite direction under the action of said spring, which serves in both instances to maintain said roller in contact with its cooperatively related cam.

The longitudinal movement of the member 385 governs the vertical movement of a rail which when elevated brings further elements into play which effect the raising and lowering of the pen arm 50. It will be noted in Fig. 8 that the lower end of bell crank 388 is pivotally connected by a shouldered screw 396, to the bearing 205 and that its upper end 307 is pivoted by a similar screw 398, to the rear end of an angle bar 400, the forward end of which is carried for parallel movement on a link 402, pivoted at its ends to said bar and to an angle bracket 405 on the base plate 11.

It is to be noted that the lower end of the downwardly extending latch arm 380 is adapted to be moved into and out of the space afforded between the rear end of the follower 385 and the front face of the wall plate 200. At such time as the latch arm 380 occupies the space just mentioned it is in inoperative position and serves to hold the follower 385 in its forward position so that the angle bar 400 is then maintained in its lowermost position, but at such time as said latch arm is moved out of its restraining position into an operative position with respect to the follower 385 the spring 392 is permitted to move that follower to its retracted position and elevate the angle bar 400.

Movement of the latch arm 380 into and out of its restraining position with reference to the follower 385 is controlled by the feeler-roller 374 (Figs. 6 and 18A), its associated trip-lever 370 and the cooperating sector gears 375 and 377. The above movement occurs whenever any one of the control apertures 368 (Fig. 15) so presents itself to the feeler-roller 374 as to permit the roller to pass therethrough and into one of the scallop-like dentures 260 with which the ring 253 of the feeding unit 251 is provided. Upon a succeeding turn of cam 381 the follower 385 is moved to its foremost position with the result that said angle bar 400 is returned to its lowermost position.

Figure 27:
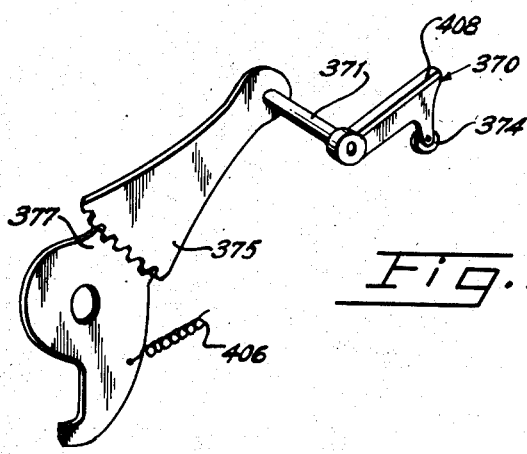
Figure 27 is a detail perspective view of the two sector gears operated by the feeler controlling the vertical movement of the stylus.

In connection with the foregoing it should be noted that as the successive control apertures 368 present themselves to the feeler roller 374, such roller is forcibly moved into one of the scallop-like indentures 260 under the action of the tension spring 406 (Fig. 27) connected at its opposite ends to the latch arm 380 below its pivot point and to the front side of the wall plate 200. As the denture bearing ring 253 continues to rotate after the feeler roller 374 has entered one of the dentures 260 it will be carried upwardly along the inclined surface of such denture and thereby transferred to the upper surface of the record 228, with which it will remain in reasonably firm rolling contact, under the action of the spring 406, until such time as another control aperture 368 presents itself thereto, whereupon the operation just described will be repeated thus causing the angle bar 400 to be again raised and lowered.

In supplementing the foregoing description of the operation of the means employed to raise and lower the angle bar 400 and of the means employed in controlling the movement of the latch arm 380 into and out of its restraining position behind the cam follower 385, I wish to point out certain facts that are peculiar to the present machine and contribute in a large measure to its successful operation.

The various elements by which the driving shaft 234 is connected to the record feeding unit 251 are such that the number of revolutions required of that shaft to effect one complete revolution of said feeding unit is the same as the number of scallop-like dentures 260 that are provided at the periphery of the ring 253, the latter being an important element of the feeding unit assembly. Moreover, it is important to observe that each of the dentures 260, in effect, begins on the periphery of the ring 253 where the adjacent denture terminates since the points of separation between adjacent dentures is of knife-edge character. One complete revolution of the driving shaft is required in order that the roller 374 may pass into and exit from a denture. Therefore as the forward edge of a control aperture 368 passes beyond or out of engagement with the feeler roller 374 the latter is allowed to drop into the bottom of the denture by reason of the tension of spring 406. By this time the cam shaft 234 has completed a one half revolution. Hence upon the succeeding one half revolution of this shaft the inclined surface of the denture acting upon roller 374 moves it outwardly so that it again rides on the surface of the record 228. During the movement just described the cam 381 presents at its high portion a relatively long dwell, as measured angularly, so as to allow an ample period of time for the latch arm 380 to traverse an arc of substantial length when moving into its restraining position at the rear of the cam follower 385 which occurs as the feeler-roller 374 rides up the inclined surface of one of the dentures 260 when emerging therefrom.

The above mentioned high portion of the cam 381 is not only of such arcuate length as to present a relatively long dwell, but is also of such radial dimension that the extent of its throw is sufficient to permit the cam follower 385 to move an ample distance forwardly to afford a space between its rear end and the front face of the wall plate 200. This space is slightly greater than the thickness of the latch arm 380 to permit that arm to move unobstructedly into its restraining position. Due to the fact that the space afforded between the cam follower 385 and the wall plate 200, when the cam roller 382 is traversing the high portion of the cam 381, is slightly greater than the thickness of the latch arm 380, it follows that during such time as said arm is maintained in restraining position the cam follower will undergo movement back and forth to a certain extent for each revolution of the driving shaft 234, but such movement will be of only trivial extent and will in no way exert any raising or lowering influence on the writing instrument 55. Referring again to the cam 381, it will be remembered that it is so timed in relation to the movement of the feeding unit 251 that when a control aperture 368 presents itself to the feeler roller 374 and that roller begins to enter one of the scallop-like dentures 260, the low portion of the cam will be next adjacent the cam roller 382 so as to permit the cam follower 385 to be retracted under the action of the spring 392 as the latch arm 380 is moved out of its restraining position incident to downward movement of the feeler roller as it enters said denture.

At such time as the feeler roller 374 is emerging from any one of the dentures 260, the latch arm 380 is being moved toward its restraining position and the cam follower 385 is being moved forwardly under the influence of the cam 381. Immediately prior to such time as the latch arm 380 enters its restraining position, the cam 381 will have moved the follower 385 to its foremost position where it is held by the high portion of said cam for a sufficient period of time to permit said latch arm to move into its restraining position at the rear of said follower, the movement of the latch arm having been initiated at such instant as the feeler roller 374 may have begun to move upwardly from one of the dentures 260 and having been completed at such instant as that roller may have been transferred to the surface of the record 228 in its passage over the feeding unit 251.

Before proceeding further with the description of that portion of the machine which has to do with the raising and lowering of the writing instrument 55, it is desired to mention the fact that it becomes desirable to manually lift the feeler roller 374 well above the feeding unit 251 to facilitate the introduction of a record 228 into the machine or the removal of such record therefrom, access to the cabinet 10, for this purpose being gained at its loading end, by opening the closures 22 and 24.

Manual lifting of the feeler roller 374 is accomplished when the lever 287 is moved to lift the roller unit 264 and its included rollers 278, 280 and 284 out of their respective record-engaging positions. Referring to Figs. 4 and 6, it will be seen that one of the arms 281 of the roller unit 264 is provided with a horizontally extending pin 407 and that the trip lever 370 is provided with a laterally extending shoulder 408 with which said pin engages and maintains engagement to lift the associated feeler roller 374 well above the feeding unit 251 at the same time the rollers 278, 280 and 284 are moved out of their respective record-engaging positions.

The mechanism employed in raising and lowering the writing instrument 55 further comprises the instrumentalities illustrated in Figs. 7 and 8, wherein it will be seen that at one side of the carriage 62 there is pivotally connected, as by a shouldered screw 410, an oscillatory lever 411, the outer end of which is provided with a sector gear 412. To the lever 411 at a point intermediate its ends there is pivotally connected, as by screw 414, a depending link 415, on the lower offset end of which is provided a roller 416, disposed beneath the upper laterally extending flange of the angle bar 400 which cooperates therewith as that angle bar is raised and lowered under the action of the cam 381 and the spring 392.

In order that the link 415 may be held in a vertical position at all times, it is pivotally connected at its upper end, by a screw 418, to the outer end of a stabilizing arm 420, pivotally connected, on a stud 421, to the carriage 62 at a point directly above the axial center of the pivotal point of lever 411. This pivotal arrangement of the arms 411 and 420 provides for their parallel movement which functions to maintain the link 415 in a vertical position under all conditions of operation. The roller 416 is held in contact with the lower face of the laterally extending flange of the angle bar 400, by a tension spring 422, connected to the lever 411, by a pin 424, and to the carriage 62, by a pin 425. This spring 422 also serves to move the lever 411 and its associated gear 412 upwardly about its point of pivot as the angle bar 400 is moved upwardly under the action of its tension spring 392.

In Figs. 2, 7 and 8 I have shown the bearing block 70 of the carriage 62 serving as a bearing for a transversely disposed cam shaft 426, the horizontal axis of which is rearwardly off-set with respect to the vertical axis of said bearing block. This off-set axial relation is desirable in order that one or the other of the oppositely disposed flat clearance faces 427 and 428 provided on the intermediate portion of the shaft 426 may coincide with the vertical axis of the bearing block 70 incident to step-by-step rotation of said shaft 426 as effected by the vertical movement of the bar 400. The clearance faces 427 and 428 may be conveniently provided by removing diametrically opposite portions of the shaft 426, leaving intact a pair of other diametrically opposed shaft portions serving as a pair of cams 429 and 430 which are adapted to be moved alternately in a forward direction beyond the vertical axis of the bearing block 70 in response to the above mentioned step-by-step rotation of said shaft.

The shaft 426 is held against longitudinal displacement by reason of the fact that it is provided at one end with a ratchet wheel 431 and at its other end with a headed screw 432, the ratchet wheel being located adjacent the outer face of the sector gear 434 loosely carried by said shaft in a thrust-bearing relation to the carriage 62 at one side thereof, as shown in Fig. 7, and the head portion of said screw being disposed in a similar relation to said carriage at the opposite side thereof.

The gear unit 434 at one side meshes with the sector gear 412 and at its opposite side carries an arm 436 on which is pivoted, as by a shouldered screw 437, a spring pressed pawl 438 cooperating with the ratchet wheel 431. The latter is provided with four ratchet teeth, as shown in Fig. 8, and adapted to be rotated to the angular extent of 90°, for each cycle of operation performed by said pawl in response to the raising and lowering of the angle bar 400.

As shown more clearly in detail in Figs. 2, 7A and 8A, the contact finger 82, which constitutes an element of the oscillatory supporting pin 52 and is carried at the lower end of its depending shank 81, is so located that it may be engaged alternately by the cams 429 and 430, as the cam shaft 426 is rotated, or may be moved under the action of its associated spring 86 into engagement with the clearance faces 427 and 428 as they are successively presented at the center line of the bearing block 70.

It will be understood from the foregoing that when the contact finger 82 is in engagement with the clearance face 428, as in Figs. 2 and 7A, the writing instrument 55 will be in its lower position in engagement with the surface of the paper. If, while this condition is prevailing, one of the control apertures 368 of the record tape presents itself to the feeler-roller 374 (riding on the surface of the record 228 as it passes over the feeding unit 251), said roller will enter one of the scallop-like dentures 260 with the result that the latch arm 380 will be moved out of its restraining position with respect to the cam follower 385. Such removal of the latch arm 380 will permit the cam follower 385 to be retracted by its associated spring 392, thereby causing the angle bar 400 to be lifted from its lowermost to its uppermost position. During upward movement of the angle bar 400, the spring 422 (Fig. 8) will rotate lever 411 upwardly, thus causing the sector gear 412 to rotate sector gear 434, to so move the pawl 438 that it will assume a slightly spaced relation to the uppermost tooth of the ratchet wheel 431, as shown in Fig. 8. Here it may be well to point out that as each ratchet wheel tooth (as it is moved under the action of the pawl 438) will come to rest in the uppermost position, shown in Fig. 8 so that each time the pawl is returned to its starting position there will be a slight space afforded between the forward end of the pawl and the ratchet tooth which is next to be engaged. This provision assures that such tooth will not interfere with the downward movement of the pawl into a position of rest on the back of a following tooth. After the angle bar 400 has completed its upward movement, the follower 385 will be moved forward under the action of the cam 381, thus causing said angle bar to move from its uppermost to its lowermost position.

Following such instant at which the follower 385 may have assumed its foremost position and prior to such time as the spring 392 may have had an opportunity to start the follower on its return travel, the feeler roller 374 will have been lifted and transferred to the surface of the record 228 and consequently the latch arm 380 will have been moved to its restraining position with relation to the follower, thereby locking the angle bar 400 in its lowermost position where it will remain until another control aperture 368 is presented to the feeler roller. As the angle bar 400 is moved from its uppermost to its lowermost position the link 415, by reason of the engagement afforded between its associated roller 416 and the laterally extending flange of said bar, will be moved downwardly, carrying with it the free end of the lever 411 and its associated sector gear 412, thus causing the pawl 438, in acting on its associated ratchet wheel 431, to rotate the shaft 426, to the angular extent of 90°. Incident to such rotation of the shaft 426, the cam 429 provided thereon will engage the contact finger 82 carried at the lower end of the supporting pin 52 and so tilt that pin, against the action of its associated spring 86 and about its point of pivotal connection 84 with its surrounding sleeve 71, as to cause the outer end of the reproducing arm 50 to move upwardly carrying with it the writing instrument 55, which is then maintained in a slightly elevated position with reference to the surface of the paper, as will be readily understood when it is taken into account that said cam 429 assumes a position of rest at 90° in a counterclockwise direction from its position shown in Figs. 2 and 7A at the conclusion of the arm-lifting operation just described.

It should be here emphasized that the reproducer arm 50 will remain held in its elevated position by the cam face 429 until such time as the control cam shaft 426 is further rotated a step in a counterclockwise direction, to disengage the cam 429 or 430 from the contact finger 82, thus permitting such finger to move, under the action of its compression spring 86 into engagement with the next surrounding clearance space 427 (or 428). In other words there is a one quarter revolution of the control shaft 426 and a corresponding up or down movement of the writing instrument for each up and down operation of the angle bar 400. The further one quarter rotation of shaft 426 just referred to does not take place until another control aperture 368 is presented to the feeler-roller 374, whereupon the angle bar 400 is again raised and lowered in the manner previously described, thus freeing the contact finger 82, and permitting it to be moved by its spring 86, into engagement with the succeeding clearance face 427 (or 428), it being understood that the downward movement of the reproducer arm 50 is initiated at the instant one of said cams disengages said contact finger and completes such movement at the instant said shaft completes the above mentioned one-quarter revolution and comes to rest leaving the succeeding clearance face in a vertical plane and the writing instrument 55 in point-contact with the paper, where it remains until another control aperture 368 is presented to the feeler-roller 374, whereupon the reproducer-arm-lifting operation is repeated.

From the foregoing, it will be understood that the length of time during which the writing instrument 55 is maintained in its elevated position is dependent upon the linear space existing between such control apertures 368 as may function in initiating the lifting operation and the next following control aperture which would, of necessity, function to initiate the lowering operation and, likewise, the space existing between the last mentioned control aperture and the control aperture next following will determine the length of time during which the writing instrument will be maintained in its lowermost position.

In order that a complete understanding may be gained as to the manner in which the record 228 is adapted to exercise individual control over the motion-translating units 100 and 100' which are respectively employed to move the writing instrument longitudinally and transversely of the machine in graphically reproducing the subject matter as recorded on said record, attention is directed to Figs. 15 and 16. In Fig. 15, for the sake of simplicity of description, all connections intermediate the gear 156 of the motion-translating unit 100 and its associated contact roller 227 are omitted except for the gear 157 and its associated arm 210, the latter being depicted as connected directly to said roller, which traverses that undulatory edge 440, of the record, which enters into the control of said motion-translating unit. The roller 227 corresponds, of course, to the roller 227', which is adapted to traverse that undulatory edge 441, of the record 228, which enters into the control of the motion-translating unit 100'. In Fig. 16, one edge of a typical record 228 is schematically and fragmentally illustrated in association with certain notations indicative of the nature and extent of its controlling influence in effecting forward and rearward movements of the carriage 62 and in effecting transverse displacement of the reproducer arm 50 to the left and to the right as considered from the rear of the machine.

Inasmuch as the Figures 15 and 16 supplement each other, especially from the standpoint of information to be gained from data graphically set forth therein, it becomes desirable that they be considered in conjunction with each other in order that the physical, geometrical and other important characteristics of the record 228 may be more readily understood from the following discussion.

The subject matter to be reproduced by the writing instrument 55 according to the operating principles of the machine herein illustrated may be recorded on the record 228 by a suitable recording machine especially designed for that purpose. As to the nature of the recording machine just mentioned, it will here suffice to say that it is functionally so characterized that by its aid in the recording process the subject matter to be reproduced is resolved into undulations $u$ and $u'$ formed, as shown, in opposite margins of the record 228 so that such record in its final form presents the undulatory edges 440 and 441 previously referred to herein. The depth of any undulation $u$—$u'$ may vary from zero to a maximum depth of .128", in the particular example herein illustrated, as measured between the innermost and outermost parallel lines $l_1$—$l_2$ appearing on each margin of the record, which is indicative of the fact that the maximum extent to which either of the rollers 227—227' may be displaced under the action of the record is .128". The lines $n$—$n'$ appearing respectively midway between the lines $l_1$—$l_2$ at each side of the record 228 may be regarded as "neutral lines" inasmuch as they represent paths at opposite margins of the record which if crossed by the respective contact rollers 227 and 227' will effect a reversal in one direction or the other of the shafts 96 and 118 respectively associated with and adapted to be rotated by the motion-translating units 100 and 100'.

Referring to Figs. 10 and 11 wherein the pawl-and-ratchet relationship is shown as having just been assumed by reason of the contact roller 227 having just reached the neutral line $n$ appearing at the left in Fig. 15 and taking into account the fact that the roller 227 is about to cross the neutral line $n$, it will be understood from Figs. 1A, 10, 11 and 14 that as said roller moves inwardly beyond said line, the sector gear 156 will so move as to rotate the disks 162 and 164 in the direction of the arrows shown thereon in Figs. 10 and 11. In that event the pawls 176—177, in conjunction with the ratchet wheel 165, will cause the shaft 96 to move in a counterclockwise direction, reference being had to Fig. 11, the pawls 182—183 being permitted to slide backwards over the ratchet wheel 168 while the pawls 178—179 and 180—181 are maintained out of engagement with the ratchet wheels 166 and 167, by the cams 138 and 145, respectively.

The extent to which the shaft 96 is thus rotated, and consequently the extent to which the carriage 62 is moved rearwardly, is dependent upon the extent to which the contact roller 227 is permitted to move inwardly as determined by the distance between the neutral line $n$ and the bottom of the particular undulation $u$ being traversed at that time. As soon as the roller 227 reaches the bottom of that undulation and begins to move outwardly, the sector gear 156 is moved in a counterclockwise direction, reference being had to Fig. 1A, thereby reversing the motion-translating unit 100 and causing the disks 162 and 164 to move, respectively, in clockwise and counterclockwise directions. At the instant such reversal takes place, the pawls 182—183, in conjunction with the ratchet wheel 168, serve to rotate the shaft 96 further in a counterclockwise direction, the pawls 176—177 being permitted to ride backwards over the ratchet wheel 165 while the pawls 178—179 and 180—181 are maintained out of engagement with the ratchet wheels 166 and 167 by the cams 138 and 145, respectively. Rotation of the shaft 96 under the action of the pawls 182—183 continues until such time as the contact roller 227 reaches the neutral line $n$, whereupon such pawls are lifted out of driving engagement with the ratchet wheel 168 by the cam 146, simultaneously therewith pawls 178—179 are released from the cam 138 and permitted to move into driving engagement with the ratchet wheel 166, pawls 176—177 are retracted under action of the cam 137, and pawls 180—181 are released from the cam 145 and permitted to move into engagement with the ratchet wheel 167. As the contact roller 227 then moves further outwardly toward the line $l_2$ next adjacent the neutral line $n$ the disks 162 and 164 are further moved respectively in clockwise and counterclockwise directions with the result that the pawls 178—179, in conjunction with the ratchet wheel 166, serve to rotate the shaft 96 in a reverse or clockwise direction, reference being had to Fig. 12, thus causing the carriage 62 to move forwardly while the pawls 180—181 are permitted to ride backwards over the ratchet wheel 167 and the pawls 176—177, 182—183 are maintained out of engagement with the ratchet wheels 165 and 168, respectively.

At the instant the contact roller 227 emerges from the particular undulation $u$ just considered and engages the outer edge of the moving record 228, rotation of the shaft 96 is discontinued and remains at rest until such time as said roller begins to enter the next succeeding undulation $u$, whereupon the sector gear 156 is rotated in a clockwise direction, thus causing the disks 162 and 164 to rotate in the direction of the arrows appearing thereon in Figs. 10 and 11. The pawl-and-ratchet relationship above described as existing during outward movement of the contact roller 227 after having passed the neutral line $n$ is maintained until such time as that roller again assumes its neutral line position in traversing said succeeding undulation now under consideration.

Taking into account the above mentioned direction of rotation of the disks 162—164 and the pawl-and-ratchet relationship that exists at the time the roller 227 enters said succeeding undulation $u$, it will become apparent that as said roller moves inwardly in its approach to the neutral line $n$ the pawls 180—181, in conjunction with the ratchet wheel 167 will cause the shaft 96 to rotate in a clockwise direction, reference being had to Fig. 11, and thus move the carriage 62 towards its foremost position.

During such movement of the carriage 62, the pawls 178 and 179 are permitted to ride backwards over the ratchet wheel 166 while the pawls 176—177 and 182—183 are maintained in their retracted positions under the holding action of the cams 137 and 146, respectively. The phase of operation just described is continued until such time as the roller 227 again assumes contact position on the neutral line $n$, whereupon the pawl-and-ratchet relationship is so changed, as shown in Figs. 10 and 11, that as said contact roller crosses and moves inwardly beyond said neutral line the motion-translating unit 100 will so function as to rotate the shaft 96 in a counterclockwise direction in accordance with the operation hereinbefore described in connection with the passage of said roller beyond the neutral line in the course of its approach to the bottom of the previously considered undulation.

From the foregoing description of the manner in which the record 228 exercises control over the operation of the motion-translating unit 100, it will become apparent that so long as the roller 227 is operating at the left of the neutral line $n$ (Fig. 15), the operation of said motion-translating unit will be such as to cause the shaft 96 to rotate in a clockwise direction (Fig. 10) thus imparting forward movement to the carriage 62. It will also become equally obvious that so long as the roller 227 is operating at the right of the neutral line $n$, the motion-translating unit 100 will be so operated as to cause the shaft 96 to rotate in a counter-clockwise direction, thus compelling the carriage 62 to move rearwardly. Here I wish to draw attention to the fact that each time the roller 227 traverses the distance between the neutral line $n$ and the adjacent line $l_2$ the shaft 96 will be moved in a clockwise direction to the extent of four ratchet teeth; and that each time said roller traverses the distance between the neutral line $n$ and the adjacent line $l_1$, said shaft will be rotated in a counter-clockwise direction to the extent of four ratchet teeth. It, therefore, follows that any undulation $u$ located wholly at the outside of the neutral line $n$ is capable, depending on its depth, of effecting rotation of the shaft 96 in a clockwise direction by increments in terms of ratchet tooth displacement ranging from one-half to four ratchet teeth incident to each transverse displacement of the roller 227 when traversing such undulation, the one-half tooth displacement being possible due to the difference in pawl-lengths as described in connection with the various ratchets with which they cooperate. Likewise, it also follows that any undulation $u$ located wholly at the inside of the neutral line $n$ is capable, depending upon its depth, of effecting rotation of the shaft 96 in a counterclockwise direction by increments ranging in terms of ratchet teeth displacement, from one-half to four ratchet teeth incident to each transverse displacement of the roller 227 when traversing that undulation.

Here it should be emphasized that even though the disks 162 and 164 reverse their direction of rotation as the roller 227 changes its direction of transverse displacement when traversing an undulation $u$ located wholly at one side or the other of the neutral line $n$, such reversal of said disks does not effect a reversal of the shaft 96, it being remembered from the earlier discussion of Figs. 10 to 13 that the only time at which the direction of rotation of said shaft is reversed is when the roller 227 crosses the neutral line $n$.

Taking into account the foregoing discussion of the undulations $u$ in relation to the shaft 96, it will become apparent that the accumulative effect of undulations located, respectively, at the left and the right of the neutral line n may be employed, on the one hand, to so rotate said shaft as to displace the carriage 62 throughout the full extent of its path of forward movement, and, on the other hand, to so rotate that shaft as to displace said carriage throughout the full extent of its path of rearward movement. It also follows that any lesser degree of movement of the carriage in either direction may be attained under the influence of a single undulation capable, as previously explained, of displacing the carriage to any longitudinally desired extent.

At times during the operation of the machine it becomes necessary to halt the movement of the carriage 62 to permit, for example, the dotting of an "i", and to that end the record 228 is provided at an appropriate point along its running length with a holding portion h disposed in a parallel relation to the record along which the contact roller 227 rides as the record tape moves forwardly. During such time as the roller 227 is traversing the holding portion h, that roller is held against traverse displacement, with the result that the motion-translating unit 100 and, consequently, the shaft 96 remain inactive, such state of inactivity being either of short or prolonged duration, depending upon the linear extent of said holding portion which may vary according to requirements. Holding portions h are shown both at the extreme outer margin and elsewhere on the record 228, with respect to various undulations in both Figs. 15 and 16.

While the carriage 62 is thus held motionless by the holding portion h, the reproducing arm 50 may be moved by the opposite undulatory edge 441 of the record-tape in the required direction and to the required extent and the writing instrument raised during the time the arm 50 is moving to the spot where the dot is to be marked, the writing instrument lowered on the record sheet to produce a dot and then raised again to shift it to the position where the writing to be resumed and once again lowered. This vertical motion of the writing instrument, as before explained, being controlled by control apertures 368 with which the advancing record-tape is provided.

Likewise, it becomes necessary at times to hold the reproducer arm 50 against transverse displacement in order to permit, for example, the dotting of an "i" or the drawing of a straight line longitudinally of the machine, and to that end the record 228 is provided with appropriate holding portions h', corresponding to the holding portions h, and on which the roller 227' rides, thus maintaining the motion-translating unit 100' and, consequently, its associated shaft 118 in a state of inactivity, the duration of which is dependent upon the linear extent of the holding portion then in command over said motion-translating unit. During the time the reproducing arm 50 is held still, by the holding portion h', the undulatory edge 440 of the record-tape may cause the carriage to move either forwardly or rearwardly with the writing instrument, controlled by control apertures 368, on the record sheet, to produce an uninterrupted line longitudinally of the machine, or with the writing instrument alternately raised and lowered, to produce a dotted or an interrupted line effect, as required.

Bearing in mind, that the motion-translating units 100 and 100' are identical from a structural as well as a functional standpoint, it is deemed unnecessary, in view of the detailed discussion already set forth in connection with the operation of the motion-translating unit 100, to elaborate on the operation of the motion-translating unit 100' to any great extent. In this connection it is to be noted that as the roller 227' moves inwardly toward the neutral line n' the reproducer arm 50 is swung in a clockwise direction (Fig. 1) to an extent depending upon the extent of movement which that roller undergoes in approaching said neutral line n'. It will be understood, of course, that as the roller 227' crosses the neutral line n', in traversing any undulation u' the motion-translating unit 100' will be so influenced as to cause the reproducing arm to move in an opposite direction, such movement being continued until the roller 227 again reaches the neutral line n' in its outward movement from the lowermost portion of the undulation toward the outer edge of the record. At the instant the roller 227' crosses the neutral line n' in its outward movement the reproducer arm is again moved in a clockwise direction, reference being had to Fig. 1. Thus it will be understood that the reproducer arm may be moved toward the right or toward the left of the machine, by increments corresponding to those particularly described in connection with the longitudinal movement of the carriage in one direction or the other under the influence of the motion-translating unit 100'.

Taking into account the nature of the controlling influence which the record 228 is adapted to exercise over the independent operable motion-translating units 100 and 100', it will become readily apparent that such record may be so characterized by the correlated undulations u and u' provided at its opposite margins that the writing instrument may be so directed in its movement with relation to the record page as to cause the writing point of that instrument to traverse the paper in any desired direction according to the dictates of the record on which is recorded the subject matter to be reproduced.

In order that the driving motor, which is adapted to be operatively connected to the power shaft 234, by a suitable belt (not shown), may be controlled, here is provided a switch unit 442 disposed within the cabinet 10 at a point adjacent the driving unit 100. This unit includes a vertical post 444, the lower shouldered end of which is screw threadedly connected to the base 11. The post 444 carries intermediate its upper and lower ends a horizontally disposed shaft 445 to one end of which is connected a collar 446 provided at its outer end with a disc 447, to the peripheral margin of which is achored one end of a coil spring 448 carried by said collar, the other end of said spring being confined within an aperture 450 formed in the post 444 and thereby held against displacement. The opposite end of the shaft 445 is connected to a bevel gear 450 and is there formed integral with a ring 451 within which is anchored a mercury switch 452 to the usual terminals (not shown) of which lead a pair of conductors 454 of the motor control circuit.

On the upper reduced shank portion 455 of the post 444, there is journaled a bevel gear 456 having a relatively long bearing like hub 457. The upper end of the shank portion 455 carries a washer 458 and a nut 460 by which the gear 456 and its associated hub 457 are held in proper operative position with relation to the gear 450. To the upper end of the hub 457, there is connected a laterally extending arm 461 provided at its outer end with a vertically extending stud 462, on which is journaled a roller 464 adapted to be engaged by one end of the sector gear 76 which constitutes an element of the motion-translating unit 100.

It will be seen from the arrangement of these parts that the gear 76 when moved a sufficient distance in a clockwise direction, as viewed in Fig. 22, will engage the roller 464 and thus cause the sector gear 456 to so move in a counter-clockwise direction as to cause the mercury switch 452 to tip downwardly to open the circuit between its terminals. As the sector gear 456 is rotated under the action of the gear 76, the tension of the spring 448 is increased, and as the gear 76 is moved in a counter-clockwise direction, reference being had to Fig. 22, the spring 448 is permitted to so act on the shaft 445 as to cause the mercury switch 452 to return to circuit-closing position.

In order that the mercury switch 452 may be manually moved to open-circuit position, the side wall 16 of the cabinet 10 carries a rotatable control unit 465, which is readily accessible from the outside of the cabinet and includes an operating knob 466 connected to the outer end of a horizontally disposed shaft 467 journaled in the side wall 16. The shaft 467 is formed integral with an indicator disc 468 to which the knob 466 is locked by a pin 468' and is provided with a pointer 470 adapted to indicate on and off positions which are identified by the indicia "On" and "Off" provided on the outer face of the cabinet wall and spaced from each other an angular distance of 90°, with reference to the axis of rotation of the shaft 467. To the inner end of the shaft 467, there is connected, as by a pin 471, a cam 472 having a high portion 474 and a low portion 475. The cam 472 may be stopped in its on and off positions by a pin 472' and is adapted to so cooperate with the sector gear 456 that such gear may be moved in a counter-clockwise direction, to open the circuit of the mercury switch 452, it being understood in this connection that when the control unit 465 is rotated in a clockwise direction to the extent of 90° (Fig. 25) the high portion 474 of the cam 472 will serve by reason of its contact with said gear to maintain the switch in open circuit position. On the other hand, when the control unit 465 is rotated in a counterclockwise direction, to the extent of 90° from its off position to its on position the spring 448 will be permitted to so act on the shaft 445 as to move the mercury switch 452 to its closed circuit position.

From the foregoing it will be understood that when the motor circuit is closed by way of the mercury switch 452 and the machine is being operated by the motor to rotate the drive shaft 234 its operation may be interrupted by so moving the control unit 465 as to move the mercury switch 452 to open circuit position. Once the motor circuit is thus opened, it may be again closed by rotating the control unit 465 to its "on" position and then closing the motor circuit by way of a push button switch 477, which is conveniently located on the cabinet and is adapted to short circuit the mercury switch 452.

Control of the motor circuit by the tape record is afforded as follows: When the record 228 is first introduced into the machine the contact roller 227', which functions in the operation of the gear 157, engages the edge 441 of said record which at its starting point is of such undulations that the gear 76 is maintained in a position farther to the right, reference being had to Fig. 22, than at any time during which the roller 227' is traversing the undulatory edge 441 of the record. To start the machine initially, the push button switch 477 is held in closed circuit position a sufficient length of time to permit the undulatory edge 441 of the record 228 to move into operative relation to the roller 227', whereupon the spring 448 then functions to move the mercury switch 452 to its closed circuit position. Here it may be well to also mention that the closed circuit position of the mercury switch 452 is maintained, unless disturbed by the control unit 465, throughout such length of time as is required for the record 228 to be substantially completely transferred from the supply reel 247 to the receiving reel 248. However, as the end of the record 228 which is attached to the hub of the supply reel 247 approaches, there is a substantial length at that end of the record that is of such width that the roller 227' when emerging from the last undulation $u$ will be moved sufficiently outwardly to cause the sector gear 76 to move into engagement with the roller 464 and thus cause the sector gear 456 to move a sufficient distance in a counterclockwise direction, to cause the mercury switch 452 to move to its open circuit position, thereby interrupting the motor circuit and thus causing the machine to stop.

At the end of each script or a design, the control-aperture of the record tape will first raise the scriber above the paper and then guide it, by suitable undulations on its margins and their cooperating feeler-rollers, from the point where the work concluded, toward extreme right and bottom of the paper, thus causing the sector-gear 76 to operate the mercury switch into "off" position and stopping the machine. At the beginning of the next scrip or design, the scriber still in lifted posture from the previous run, will be guided by undulations on the record to the spot where the subsequent writing or drawing is to start. The scriber is then lowered on the paper by the control-aperture of the record and operation of the machine again begins. The undulations on the record, guiding the scriber toward the initial spot where a script or a design is to begin and those guiding the scriber toward the mercury switch, at the end of each work, are effective in securing equal margins around each work, as intended when the record tape was made.

I claim:

1. In a machine for reproducing linear facsimiles, the combination with a surface for holding a recording sheet and a scriber located thereabove, supporting means for the scriber comprising a longitudinally movable carriage and a turret thereon, a rack on the carriage and a segmental gear on the turret, of a master record having separate portions corresponding to the longitudinal and lateral characteristics of the subject matter to be reproduced, separate feelers cooperating with said two record characteristics, and gearing connections operated by said feelers and each imparting movement to said rack and gear for correspondingly moving the scriber.

2. In a machine for reproducing linear facsimiles, the combination with a cabinet having at one end a top surface for holding a record sheet and at the other end below the plane of said surface a mounting for a movable master record having separate portions corresponding to the longitudinal and lateral characteristics of the subject to be reproduced, of a scriber located above the sheet, a carriage guided for longitudinal movement in the cabinet having a gear rack, a turret on the carriage provided with a gear sector and a mounting for the scriber connected to the turret, separate feelers cooperating with the master record and actuated thereby, a set of gearing connections actuated by one of the feelers and operating on said carriage rack, and a similar set of gearing connections actuated by the other feeler and operating on the turret gear, said two sets of gearing determining the longitudinal and transverse positions of the scriber.

3. In a machine for reproducing linear facsimiles, the combination with a cabinet having at one end a top surface for holding a record sheet and at the other end below the plane of said surface a mounting for a movable master record having separate portions corresponding to the longitudinal and lateral characteristics of the subject to be reproduced, of a longitudinal control guide in the cabinet and a carriage slidable thereon having at one side a gear rack, a turret carried by the rear end of the carriage having a sector gear extending forwardly therefrom over the carriage and gears on the carriage for oscillating the turret extending laterally at the other side of the carriage, parallel shafts extending along opposite sides of the carriage one of which is geared to said rack, the other being connected to the sector gearing, a scriber connected to the turret, two oscillatory feelers cooperating with the master record each controlling the rotary movement of one of said shafts and means for driving said record past said feelers.

4. In a machine of the character described, the combination with a plane surface for holding a recording sheet, a scriber located above it, a bearing support beneath the plane of the sheet having a vertical opening and a rock arm therein carrying the scriber, of a transverse shaft having a cam surface cooperating with said arm to raise and lower said scriber relatively to the sheet, means controlling the rotation of the shaft comprising a vertically acting horizontal member, a drive shaft having a cam controlling the movement of said part, and a restraining member normally holding said part against movement, a master record driven by said drive shaft having a series of spaced apertures, a feeler actuated by said apertures which upon entering an aperture trips the restraining member.

5. In a machine of the character described, the combination with a plane surface for holding a recording sheet, a scriber located above it, a bearing support beneath the plane of the sheet having a vertical opening and a rock arm therein carrying the scriber, of a transverse shaft having a cam surface cooperating with said arm to raise and lower said scriber relatively to the sheet, means controlling the rotation of the transverse shaft comprising a horizontal member vertically acting under spring action and having an inoperative position, a drive shaft having a cam operating to set said member in its inoperative position, and a movable stop for retaining said member normally immovable, a master record driven by the drive shaft having a series of apertures, a feeler actuated by said apertures and connected to said retaining stop for moving it into an operative position to permit said vertically movable member to be elevated.

6. In a machine of the character described, the combination with a plane surface for holding a recording sheet, a scriber located above it, a bearing support beneath the plane of the sheet having a vertical opening and a rock arm therein carrying the scriber, of a transverse shaft having alternately disposed cam faces and clearance spaces cooperating with said arm to raise and lower the scriber in relation to the sheet, sector gears and a ratchet operated thereby for rotating said shaft step-by-step, a vertically acting horizontal member for actuating said gears and having an inoperative position, a drive shaft having a cam for setting said member in an inoperative position, a spring for moving the member vertically, and a restraining latch for holding said member against the action of the spring, a master record driven by the drive shaft having a series of spaced apertures, a pivoted feeler riding on the record and actuated by said apertures, and connections between the feeler and said latch for retracting it into an operative position to release said member for vertical movement upon presentation of a record aperture to the feeler.

7. In a machine for reproducing linear facsimiles, the combination with a surface for holding a recording sheet and a scriber located thereabove capable of lateral, longitudinal and vertical movements with reference to said sheet, of a master record having separate portions for effecting the above three movements of the scriber in accordance with the characteristics of the subject to be reproduced, and means for driving said record, a longitudinally movable carriage, an oscillatory turret thereon and a rock arm in the turret carrying the scriber, of a transverse shaft in the turret having alternately disposed cam faces and clearance spaces cooperating with said arm to raise and lower the scriber in relation to the sheet, sector gears and a ratchet operated thereby for rotating said shaft step-by-step, a vertically acting horizontal rail for operating said gears extending parallel to the path of movement of said carriage and a spring for moving the rail vertically, a drive shaft having a cam for setting the rail in its loweremost position, a restraining latch for holding the rail against the action of said spring, a series of spaced apertures, a pivoted feeler riding on the record and actuated by said apertures, and connections between the feeler and said latch for retracting it into an operative position to release said member for vertical movement upon presentation of a record aperture to the feeler.

8. In a machine of the character described, the combination with a plane surface for holding a record sheet, a carriage movable longitudinally beneath the sheet, a turret thereon having a vertical aperture, a rock arm pivoted therein and a scriber mounted on the arm and extending over said sheet, a transverse shaft on the turret having alternate cam faces and clearances cooperating with the rock arm, sector gears and a ratchet operated thereby and supported on the turret for rotating said shaft step-by-step, of a master tape record having undulating edges and provided with apertures, means controlled by one of the tape edges for moving the carriage and other means controlled by the other edges of the tape for controlling the oscillatory movement of the turret, a vertically acting horizontal rail extending at one side of the carriage serving to actuate the sector gears on the turret, a spring for elevating the rail, a drive shaft for driving the record having a cam serving to move said rail into its lowermost position, a latch for normally holding the rail depressed, a feeler cooperating with the tape notches and connections between it and the latch for moving the latter into operative position whenever a tape aperture passes beneath the feeler.

9. In a machine of the character described, the combination with a plane surface for holding a recording sheet, a scriber located above it, a bearing support beneath the sheet having a vertical opening, and a rock arm pivoted thereon, a spring moving it in a direction to press the scriber against the sheet, said arm having at its lower end a finger portion provided with a rounded face lying in the plane of the axis of movement of the arm, a transverse shaft having alternate cam faces and clearances cooperating with said finger face, a movable master record having separate portions corresponding to the longitudinal, lateral and interrupted characteristics of the subject matter to be reproduced and separate means actuated by said record for imparting longitudinal movement to the carriage, oscillatory movement to turret and step-by-step rotary movement to said shaft.

10. In a machine of the class described, the combination with a surface for holding a record sheet, an underlying support, a scriber mounted thereon extending over the sheet and pivoted for movement toward and from the sheet, of a tape record provided with control apertures, a driven wheel for advancing the tape having a dentured portion lying beneath the path of said apertures, a drive shaft for rotating said wheel, a cam thereon, a longitudinally movable bar for rocking the scriber operated in one direction by said cam, and a spring for moving the bar in the opposite direction, a latch for holding the bar against the movement of the spring, a feeler riding on the surface of the tape and passing through the apertures therein into the dentures of the feed wheel, sector gears connecting said latch and feeler for holding the former in inoperative position behind the bar when the latter is riding on the surface of the tape.

11. In a machine of the class described, the combination with a surface for holding a record sheet, an underlying support, a scriber mounted thereon extending over the sheet and pivoted for movement toward and from the sheet, of a tape record provided with control apertures, a drive wheel for advancing the tape having a dentured portion lying beneath the path of said apertures, a drive shaft for rotating said wheel, a cam thereon, a longitudinally movable bar for rocking the scriber operated in one direction by said cam, and a spring for moving the bar in the opposite direction, a latch for holding the bar against movement of the spring, a feeler riding on the surface of the tape and passing through the apertures therein into the dentures of the feed wheel, sector gears connecting said latch and feeler, a spring for operating them in a direction to retract the latch and press the feeler against the surface of the tape and into successive apertures therein, said parts being so arranged that when the feeler is riding on the tape said latch is in inoperative position to arrest the movement of the bar.

12. In a machine for producing facsimiles from a master record having portions corresponding to the characteristics of the original comprising a surface for holding a receiving sheet and a scriber operating in conjunction therewith, of means for operating the scriber longitudinally, transversely and vertically with reference to said sheet comprising two parallel oscillatory shafts and a vertically acting horizontal bar, pairs of ratchets on the shafts, each pair having teeth extending in opposite directions to those of its companion, discs on the shafts, pawls on said discs cooperating with the ratchets and means controlled by the record for oscillating the discs, cam surfaces for regulating the engagement of the pawls with their respective ratchets, a drive shaft for moving the record having a cam for setting the bar in one position, a spring for moving the bar into a second position when relieved by the cam and a latch restraining the movement of the bar under the influence of the spring and means for tripping the latch controlled by portions of said record.

13. A latch for producing facsimiles from a master record comprising a frame having a surface for holding a recording sheet, said record having portions corresponding to the subject to be reproduced, a stylus and means for moving it longitudinally of the sheet comprising an oscillatory shaft, two pairs of twin ratchets on the shaft, one of each pair having its teeth extending in a direction opposite to those of its twin, a disc on the shaft for each pair of ratchets, pawls on the discs cooperating with each of said ratchets, stationary cams on the frame cooperating with said pairs of pawls and governing their independent action and means controlled by the record for oscillating said discs in unison in opposite directions.

14. A machine for producing facsimiles from a master record comprising a frame having a surface for holding a recording sheet, said record having portions corresponding to the subject to be reproduced, a stylus and means for moving it transversely of the sheet comprising an oscillatory shaft, two pairs of twin ratchets on the shaft, one of each pair having its teeth extending in a direction opposite to those of its twin, a disc on the shaft for each pair of ratchets, pawls on the discs cooperating with each of said ratchets, stationary cam plates adjustable on the frame each having cam surfaces individual to the respective pairs of pawls and governing their independent action relatively to each other and means controlled by the record for oscillating said discs in unison.

15. A machine for producing facsimiles from a master record comprising a frame having a surface for holding a recording sheet, said record having portions corresponding to the subject to be reproduced, a stylus and means for moving it longitudinally and transversely of the sheet comprising two oscillatory shafts, two pairs of twin ratchets on each shaft, one of each pair having its teeth extending in a direction opposite to those of its twin, discs on the shafts for each pair of ratchets, pairs of pawls on the respective discs cooperating with each ratchet, adjustable stationary cam plates attached to the frame adjacent said discs each having a cam surface individual to the respective pairs of pawls and governing their independent action relatively to each other and means controlled by the record for oscillating said discs on each shaft in unison.

16. A machine for producing facsimiles from a master record comprising a frame having a surface for holding a recording sheet, said record having portions corresponding to the subject to be reproduced, a stylus and means for moving it longitudinally and transversely of the sheet comprising two oscillatory shafts, two pairs of twin ratchets on each shaft, one of each pair having its teeth extending in a direction opposite to those of its twin, discs on the shafts for each pair of ratchets, pairs of spring operated pawls of unequal length on the respective discs cooperating with each ratchet, said pairs of pawls being interlocked for simultaneous operation in a direction against their springs, stationary cam plates on the frame having surfaces for lifting the respective pairs of pawls away from their individual ratchets when in certain positions of relative adjustment with respect to other sets of pawls and means controlled by the record for oscillating the pairs of discs on the respective shafts in unison in opposite directions.

17. A machine for producing facsimiles from a master record, said record being in the form of a tape having portions corresponding to the characteristics of the subject to be reproduced, a frame having a support for a record sheet, a stylus and means for moving it over said sheet in accordance with said characteristics of the tape, a wall on the frame and a record drive wheel over which said tape passes journaled on the wall, supply and take-up spools journaled on the wall below and at opposite sides of said wheel, a yoke member composed of jointed arms having two rollers engaging the record tape at opposite sides of the wheel and a third roller bearing on said tape on the top of the wheel, means for driving the wheel and the take-up spool.

18. A machine for producing facsimiles from a master record, said record being in the form of a tape having portions corresponding to the characteristics of the subject to be reproduced and provided with longitudinally spaced apertures, a frame having a support for a record sheet, a stylus and means for moving it over said sheet in accordance with said characteristics of the tape, a wall on the frame and a record drive wheel over which said tape passes journaled on the wall, said wheel having teeth spaced to engage the tape apertures, supply and take-up spoons for the tape located at opposite sides of the wheel, a yoke member composed of pivoted arms located forward of the plane of the wheel, said arms having studs extending at each side of and adjacent the periphery of the wheel, spaced rollers on the arm studs engaging the tape at opposite sides of the wheel teeth, a spring acting on said yoke for engagement of said rollers with the tape and means for driving the wheel and take-up spool.

19. A machine for producing facsimiles from a master record, said record being in the form of a tape having portions corresponding to the characteristics of the subject to be reproduced, a frame having a support for a record sheet, a stylus and means for moving it over said sheet in accordance with said characteristics of the tape, a wall on the frame and a record drive wheel over which said tape passes journaled on the wall, supply and take-up spools at opposite sides of said wheel, a yoke member composed of jointed arms pivoted at their lower ends centrally below the wheel, studs on the wall located within the yoke and means for moving the latter into engagement with the studs to separate the arms, rollers carried on the latter engaging the tape at opposite sides of the wheel and means for driving the wheel and take-up spool.

20. A machine for producing facsimiles from a master record, said record being in the form of a tape having portions corresponding to the characteristics of the subject to be reproduced and provided with longitudinally spaced apertures, a frame having a support for a record sheet, a stylus and means for moving it over said sheet in accordance with said characteristics of the tape, a wall on the frame and a record drive wheel over which said tape passes journaled on the wall, said wheel having teeth spaced to engage the tape apertures, supply and take-up spools for the tape located at opposite sides of the wheel, a yoke member composed of pivoted arms lying against the wall, said arms having studs extending at each side of and adjacent the periphery of the wheel, spaced rollers on the studs engaging the tape at opposite sides of the wheel teeth, other arms extending upwardly from the studs and meeting above the wheel, spaced rollers at said meeting point bearing on the tape at the top of the wheel and means for driving the wheel and take-up spool.

21. A machine for producing facsimiles from a master record, said record being in the form of a tape having portions corresponding to the characteristics of the subject to be reproduced and provided with control apertures, a frame having a support for a record sheet, a stylus and means for moving it longitudinally and transversely of the sheet in accordance with the characteristics of the tape, other means for moving the stylus from and toward the sheet, embodying a link-supported vertically acting bar, a wall on the frame and a record drive wheel over which the tape passes journaled on the wall, said wheel having circumferential notches alined with the tape apertures, a feeler riding on the tape comprising an arm pivoted on the wall and having a sector gear, a latch also pivoted on the wall movable into and out of the path of movement of said bar to restrain its vertical action and having a sector gear meshing with that of the feeler, a spring for rotating said latch and forcing the feeler into the successive tape apertures and the corresponding wheel notches to alternately effect the raising and lowering of the stylus, and means for rotating the drive wheel to feed the tape lengthwise.

22. A machine for producing facsimiles from a master record, said record being in the form of a tape having portions corresponding to the characteristics of the subject to be reproduced, a frame having a support for a record sheet, a stylus and means for moving it over said sheet in accordance with said characteristics of the tape, a wall on the frame and a record drive wheel over which said tape passes journaled on one side of the wall, a drive shaft extending parallel to the wall on the other side of the wall, a worm and worm gear connecting the shaft and wheel, supply and take-up spools for the tape located at opposite sides of the wheel and a ratchet feed mechanism actuated by the drive shaft for rotating the take-up spool.

23. A machine for producing facsimiles from a master record, said record being in the form of a tape having portions corresponding to the characteristics of the subject to be reproduced, a frame having a support for a record sheet, a stylus and means for moving it over said sheet in accordance with said characteristics of the tape, a wall on the frame and a record drive wheel over which said tape passes journaled on one side of the wall, supply and take-up spools for the record tape at opposite sides of the wheel, a brake bearing against the supply spool, a drive shaft rotating the feed wheel, a cam thereon, a pivoted bell crank lever swung by the cam and a ratchet drive for the take-up spool operated by said lever serving to advance the rotation of the spool in accordance with the tension on the tape.

24. In an automatic facsimile writing machine having a scribing instrument and motion translating units for moving it longitudinally, transversely and vertically with reference to a record sheet, the combination with a control element comprising a record tape, of instrumentalities governed by said tape for actuating said translating units, a feed wheel across which the tape passes and by which it is advanced, means for driving the wheel, a spring-biased yoke above and alongside the wheel and roller contact points on the yoke engaging the tape and holding it in contact with the wheel, a cam adjacent said yoke, a lever for actuating the cam, said yoke being movable transversely by means of said cam to the axis of the wheel to lift its rollers into an inoperative position to permit the application of the tape to said wheel.

25. In an automatic facsimile writing machine having a scribing instrument and motion translating units for moving it longitudinally, transversely and vertically with reference to a record sheet, the combination with a control element comprising a record tape, of instrumentalities governed by said tape for actuating said translating units, a feed wheel across which the tape passes and by which it is advanced, means for driving the wheel, a spring-biased yoke above and alongside the wheel composed of jointed pairs of lower and upper arms, rollers carried thereon engaging the tape at each side of the feed wheel and at the top of said wheel, a cam adjacent said yoke, a lever for actuating the cam, said yoke as a whole being movable by said cam in a direction to simultaneously disengage said rollers and move them into an inoperative position.

26. In an automatic facsimile writing machine having a scribing instrument and motion translating units for moving it longitudinally, transversely and vertically with reference to a record sheet, the combination with a control element comprising a record tape having undulating edges and control apertures therein, of a feed wheel for the tape and means for driving it, instrumentalities governed by the edges of the tape for actuating the translating units, other instrumentalities for controlling the vertical movement of the scriber comprising a feeler overriding the tape and actuated by the tape apertures, a movable yoke above and alongside the wheel, rollers thereon engaging the tape and holding it in contact with the feed wheel, and means for adjusting the yoke manually to move the rollers out of engagement with the tape and simultaneously lift the feeler away from the tape.

27. In a machine for reproducing facsimiles, the combination with a surface for holding a recording sheet and a scriber located thereabove, supporting means for the scriber comprising a longitudinally disposed guide, a carriage movable on said guide, a turret on the carriage and a rockable pin in the turret connected to the scriber, of a record element in the form of a tape having undulatory edges and provided with control openings, said undulatory edges and openings respectively representing characteristics of the subject to be reproduced, a drive shaft, means for driving the record tape by the drive shaft; means for rocking said rockable pin to raise and lower the scriber in respect to the sheet comprising a cam on said drive shaft, a cam follower movable in one direction by said cam, a spring urging the cam follower in the opposite direction, a longitudinally extending bar connected to said cam follower for vertical operation, and means connecting said bar to said rockable pin for rocking it by the action of said cam on the cam follower against the action of said spring; means controlling the operation of the cam follower comprising a spring-pressed feeler normally riding on the surface of the record tape, a latch arm normally restraining the movement of said cam follower against the action of said spring, and connecting means between the feeler and the latch arm for shifting it from its restraining position in respect to the cam follower when the feeler enters a control opening in the record tape.

28. In a machine for reproducing facsimiles, the combination with a surface for holding a recording sheet and a scribing instrument located above the sheet, means for supporting said instrument for movement both lengthwise and crosswise of the sheet and also vertically toward and from the sheet comprising a longitudinally extending guide, a carriage movable thereon, an oscillatory turret on the carriage and a rockable pin in the turret connected to said scribing instrument; of a record tape having control undulations in its two edges corresponding respectively to longitudinal and transverse characteristics of the subject to be reproduced and provided with control apertures, means for driving the record tape, operating means for the carriage including a shaft carrying an oscillatory motion-translating unit actuated by the undulations on one edge of the tape, operating means for oscillating the turret including a shaft carrying an oscillatory motion-translating unit actuated by the undulations on the other edge of the tape, operating means for rocking said rockable pin to alternately effect the raising and lowering of the writing instrument in relation to the sheet comprising a drive shaft, a cam thereon, a cam follower actuated by said cam in one direction, a spring urging the cam follower toward the cam, a longitudinally extending vertically acting bar connected to the cam follower, a transverse shaft provided with cam portions coacting with said rockable pin, connecting means between said bar and said transverse shaft for partial rotation of the latter upon movement of the cam follower by said cam, a pivoted feeler riding on the surface of the record tape, a latch arm connected to the feeler and disposed normally in the path of movement of the cam follower to restrain its movement toward the cam when the feeler is riding on the surface of the record tape, and a spring urging the feeler to enter successively said control apertures in the tape upon advance thereof and thereby tripping the latch arm from its restraining position to release said cam follower for movement toward the cam by the action of the first named spring.

29. An automatic facsimile writing and drawing machine comprising a frame having a support for a receiving sheet, a scribing instrument and means for moving it longitudinally and transversely of the sheet in either direction over the area thereof, means for operating the scribing instrument in said longitudinal and transverse directions comprising two parallel shafts, a motion-translating mechanism on each of said shafts for oscillatory movement, means cooperating with each of said motion-translating mechanisms for translating said oscillatory movement into rotary movement in one or in the opposite direction to the respective shaft; means for operating said shafts comprising a record element structurally in the form of a relatively thin and narrow tape having control undulations in both edges thereof corresponding respectively to longitudinal and transverse characteristics of the subject to be produced, a spring-pressed feeler at each side of the tape for oscillatory movement by the action of said control undulations, connections between the feelers and the motion-translating mechanisms for imparting thereto corresponding oscillatory movements effective in controlling the direction of the rotary movement and the extent of such movement in one direction of said shafts by the controlling action of said undulations, and means for driving the record tape.

30. An automatic facsimile writing and drawing machine comprising a frame having a support for a recording sheet, a scribing instrument and means for moving it longitudinally and transversely of the sheet over the entire area thereof, means for operating the scribing instrument in said longitudinal and transverse directions comprising two parallel shafts, a motion-translating mechanism on each of said shafts for oscillatory movement, means associated with each of said motion-translating mechanisms for translating said oscillatory movement into step-by-step rotary movement in either direction to the respective shaft, said last named means including ratchet wheels, pawls and stationary cams cooperating with said pawls, said step-by-step movement capable of aggregation in a single direction to a varying extent by said last named means; a record element in the form of a tape having control undulations in its two edges corresponding respectively to longitudinal and transverse characteristics of the subject to be produced by the scribing instrument, a spring-pressed feeler cooperating with said undulations at each side of the tape for oscillatory movement, connecting means between the feelers and said motion-translating mechanisms for imparting thereto corresponding oscillatory movements, certain undulations at each side of the record tape effective for producing oscillatory movements to motion-translating mechanisms and translatable by said associated means into rotary movements in one direction to the respective shafts, and other undulations at each side of the tape effective for producing oscillatory movements to said motion-translating mechanisms translatable by said associated means into rotary movements in the opposite direction to their shafts, and means for driving the record tape.

31. An automatic facsimile writing and drawing machine comprising a record, said record being in the form of a tape having control undulations in its two edges corresponding respectively to longitudinal and transverse characteristics of the subject to be produced, a drive shaft, means for driving the record tape by said drive shaft, a frame having a support for holding a receiving sheet, a scribing instrument, supporting means for said instrument for movement in one and in the opposite direction longitudinally and transversely of the sheet over the area thereof, said supporting means comprising a longitudinally extending guide, a carriage for movement thereon provided with a rack, a turret on the carriage for oscillatory movement independently of the movement of the carriage and provided with a sector gear, a mounting on the turret carrying said scribing instrument, operating means for the carriage for movement in both directions on said guide actuated by control undulations in one edge of the record tape, operating means for the turret for swinging movement in both directions on said carriage actuated by the other edge of the record tape, said operating means comprising pivoted feelers coacting with the edges of the tape for oscillatory movement by the action of said control undulations thereon during movement of the tape, two shafts extending along opposite sides of said guide, motion-translating means on said shafts connected to said feelers for translating oscillatory movements imparted thereto by said feelers into step-by-step rotary movement to respective shafts, and gearing connections between one of said shafts and said rack and between the second shaft and said sector gear, effective in controlling the movement of said scribing instrument in accordance with the record tape.

32. An automatic facsimile writing and drawing machine comprising a record tape having control undulations in its two edges corresponding respectively to longitudinal and transverse characteristics of the subject to be produced, means for driving the record tape, a support for holding a receiving sheet a longitudinally extending guide, a carriage movable on said guide in both directions provided with a rack, a turret on the carriage for swinging movement in both directions provided with a sector gear, a mounting on the turret, a scribing instrument carried by said mounting for movement over the sheet longitudinally and transversely within the range thereof by said carriage and said turret respectively, two shafts paralleling said longitudinal guide one of which is geared to said rack, the other is geared to said sector gear, two spring-pressed feelers cooperating with the edges of the record tape for oscillatory movement of varying extent by the action of said control undulations, and oscillatory motion-translating means on each of said shafts connected to one of said feelers for translating said varying-in-extent-oscillatory-movements imparted thereto by said feelers into step-by-step rotary movement of corresponding varying extent to the respective shafts in the direction controlled by said control undulations.

LEON PAUL BLACK.

References Cited in the file of this patent

UNITED STATES PATENTS

| Number | Name | Date |
|---|---|---|
| 47,315 | McGill | Apr. 18, 1865 |
| 1,080,486 | Sheagren | Dec. 2, 1913 |
| 1,159,280 | Schorno | Nov. 2, 1915 |
| 1,386,332 | Hendrickson | Aug. 2, 1921 |
| 1,436,415 | Sullivan et al. | Nov. 21, 1922 |
| 1,516,998 | Curry et al. | Nov. 25, 1924 |
| 1,573,205 | Taylor et al. | Feb. 16, 1926 |
| 1,642,369 | Hendrickson | Sept. 13, 1927 |
| 1,663,851 | Linaker et al. | Mar. 27, 1928 |
| 1,742,060 | Coulson | Dec. 31, 1929 |
| 1,759,989 | Leaman | May 27, 1930 |
| 1,928,559 | Darnhofer | Sept. 26, 1933 |
| 1,945,928 | Wilkins et al. | Feb. 6, 1934 |
| 2,091,060 | Watson | Aug. 24, 1937 |
| 2,332,511 | Glassman et al. | Oct. 25, 1943 |
| 2,463,536 | Hitt | Mar. 8, 1949 |

FOREIGN PATENTS

| Number | Country | Date |
|---|---|---|
| 23,072 | Great Britain | 1913 |
| 23,327 | Great Britain | 1901 |
| 356,492 | Great Britain | Sept. 10, 1931 |